(12) United States Patent
Yanagida et al.

(10) Patent No.: US 11,380,201 B2
(45) Date of Patent: Jul. 5, 2022

(54) PARKING ASSISTANCE SERVICE MANAGEMENT DEVICE, AGENT TERMINAL, MANAGEMENT METHOD, AND NON-TRANSITORY COMPUTER-READABLE STORAGE MEDIUM

(71) Applicant: TOYOTA JIDOSHA KABUSHIKI KAISHA, Toyota (JP)

(72) Inventors: Tohru Yanagida, Nagoya (JP); Chikage Kubo, Chofu (JP); Ai Fujimura, Toyota (JP); Shunsuke Noda, Kakamigahara (JP); Satoshi Usui, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 424 days.

(21) Appl. No.: 16/189,114

(22) Filed: Nov. 13, 2018

(65) Prior Publication Data

US 2019/0189011 A1    Jun. 20, 2019

(30) Foreign Application Priority Data

Dec. 15, 2017   (JP) .............................. JP2017-241128

(51) Int. Cl.
| | |
|---|---|
| *G08G 1/00* | (2006.01) |
| *G08G 1/14* | (2006.01) |
| *G06Q 10/02* | (2012.01) |
| *G08G 1/005* | (2006.01) |
| *H04W 4/02* | (2018.01) |

(52) U.S. Cl.
CPC ............ *G08G 1/148* (2013.01); *G06Q 10/02* (2013.01); *G08G 1/005* (2013.01); *G08G 1/144* (2013.01); *G08G 1/205* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 8,943,187 B1* | 1/2015 | Saylor | E05B 45/06 709/223 |
| 2018/0268322 A1* | 9/2018 | Liu | G06Q 20/145 |
| 2019/0035274 A1* | 1/2019 | Sabagh | G08G 1/123 |

FOREIGN PATENT DOCUMENTS

| | | |
|---|---|---|
| JP | 2002-24367 A | 1/2002 |
| JP | 2006-209429 | 8/2006 |
| JP | 2009-91760 A | 4/2009 |
| JP | 2013-134641 A | 7/2013 |
| JP | 2016-509287 A | 3/2016 |

* cited by examiner

*Primary Examiner* — James M McPherson
(74) *Attorney, Agent, or Firm* — Oblon, McClelland, Maier & Neustadt, L.L.P.

(57) ABSTRACT

A parking assistance service management device that manages a parking assistance service in which an agent provides parking assistance for a vehicle of a service user includes a reception unit configured to receive user information including information indicating a position of the vehicle from a terminal of the service user, a specifying unit configured to specify a terminal of the agent providing the parking assistance for the vehicle based on the user information, and a transmission unit configured to transmit the information indicating the position of the vehicle to the terminal of the agent.

7 Claims, 15 Drawing Sheets

FIG. 5

USER DB  417

| | PERSONAL INFORMATION | | | VEHICLE INFORMATION | | | |
|---|---|---|---|---|---|---|---|
| USER ID | NAME | CONTACT ADDRESS | USER TERMINAL INFORMATION | VEHICLE TYPE | VEHICLE NUMBER | COLOR | KEY UNIT INFORMATION |
| | | | | | | | |
| | | | | | | | |
| | | | | | | | |
| | | | | | | | |
| | | | | | | | |

| SERVICE USE-RELATED INFORMATION | | | | ASSOCIATION |
|---|---|---|---|---|
| USE DATE AND TIME | DELIVERY PLACE | DESTINATION | CURRENT POSITION | AGENT ID |
| | | | | |
| | | | | |
| | | | | |
| | | | | |
| | | | | |

FIG. 6

AGENT DB  418

| | PERSONAL INFORMATION | | | STATUS INFORMATION | | | | ASSOCIATION |
|---|---|---|---|---|---|---|---|---|
| AGENT ID | NAME | CONTACT ADDRESS | AGENT TERMINAL INFORMATION | RESPONSE AVAILABILITY | LOCATION AREA | CURRENT POSITION | MOVEMENT SPEED | USER ID |
| | | | | | | | | |
| | | | | | | | | |
| | | | | | | | | |
| | | | | | | | | |
| | | | | | | | | |

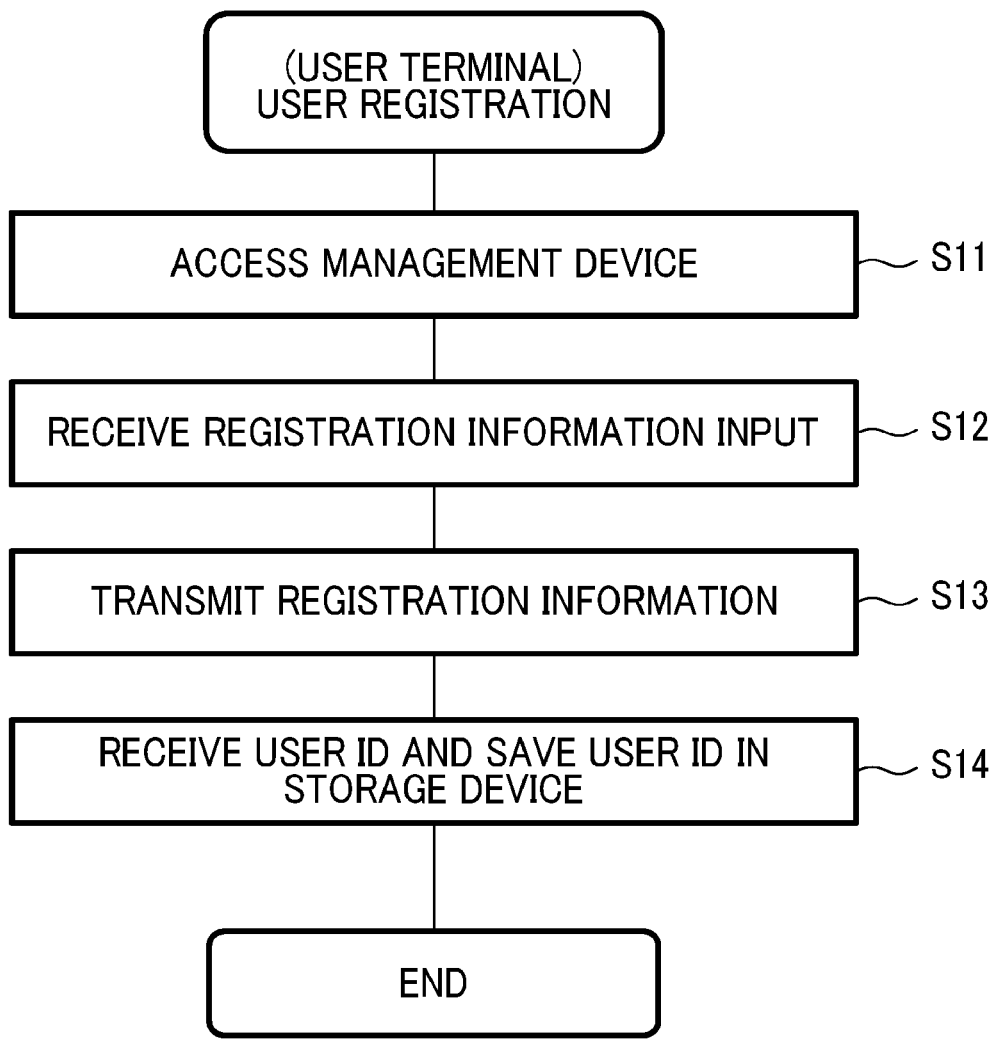

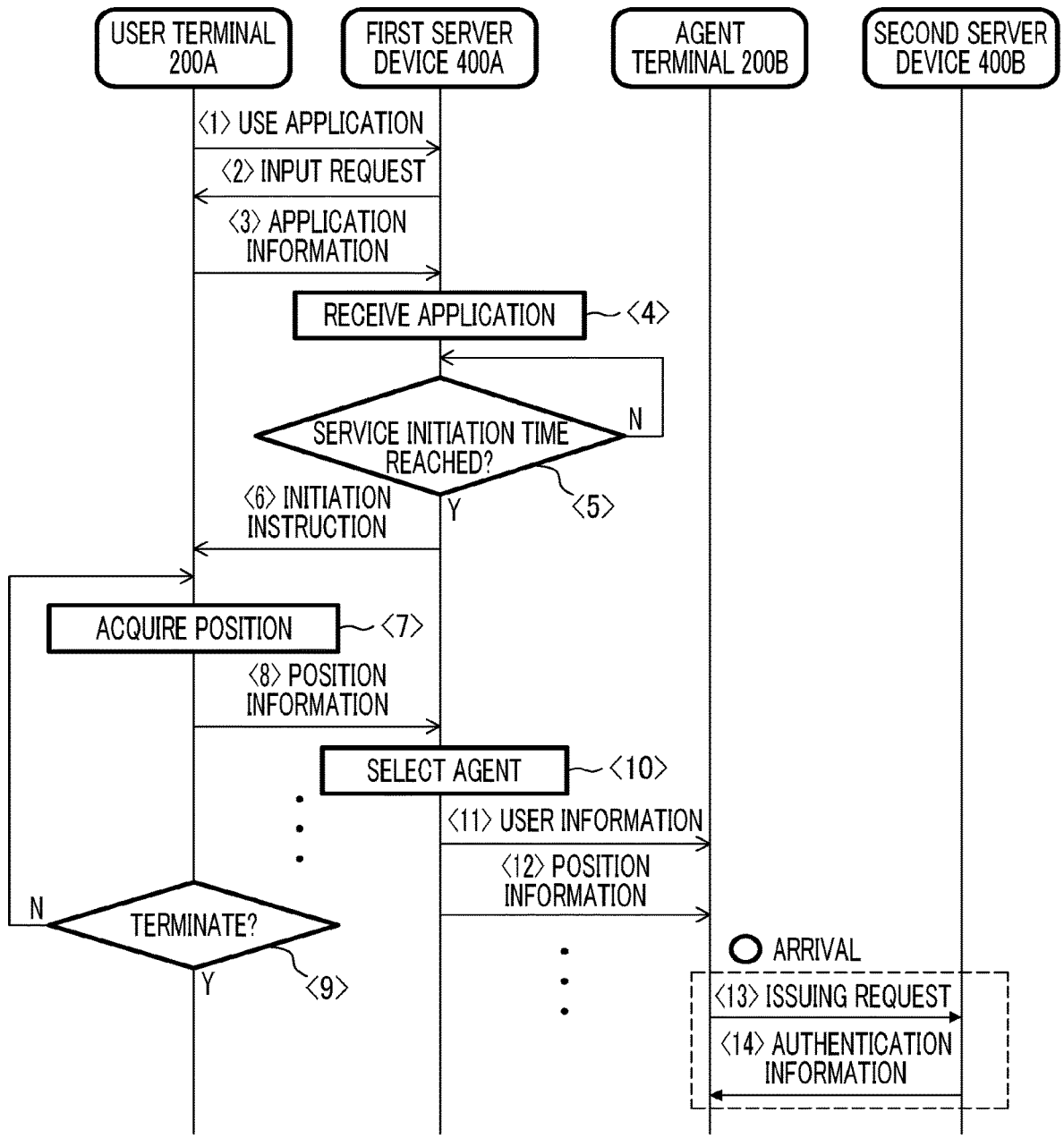

PARKING ASSISTANCE SERVICE MANAGEMENT DEVICE, AGENT TERMINAL, MANAGEMENT METHOD, AND NON-TRANSITORY COMPUTER-READABLE STORAGE MEDIUM

INCORPORATION BY REFERENCE

The disclosure of Japanese Patent Application No. 2017-241128 filed on Dec. 15, 2017 including the specification, drawings and abstract is incorporated herein by reference in its entirety.

BACKGROUND

1. Technical Field

The disclosure relates to a parking assistance service management device, an agent terminal, a management method, and a non-transitory computer-readable storage medium storing a program managing the parking assistance service.

2. Description of Related Art

In a case where a driver visits a predetermined destination (such as a store, a shopping mall, and an event venue) by driving a vehicle for shopping, event participation, event appreciation, and so on, a parking lot at the destination may be full. Then, the driver has to stand by in a parking queue, while driving the vehicle, until an empty parking space (hereinafter, referred to as an "empty space") becomes available. In some cases, the empty space cannot be found with ease even if the driver searches for the empty space by slowly driving in the parking lot. Sometimes, another driver parks his or her vehicle ahead of the driver with the driver overlooking the empty space. In some cases, the driver may have to give up on the parking lot at the destination and park his or her vehicle at another parking lot near the destination. Not a few drivers regard the above-described parking lot and space search and waiting for an available empty space as a waste of time.

In the related art, Japanese Unexamined Patent Application Publication No. 2006-209429 (JP 2006-209429 A) discloses a parking guidance navigation system guiding a vehicle to an empty space in a case where, for example, the empty space becomes available during parking space search for the vehicle.

SUMMARY

In the related art, it is possible to shorten the time taken until parking after the empty space becomes available. However, a driver should continue driving the vehicle until parking is completed by the driver moving the vehicle to the empty space after the empty space becomes available.

Conceivable in this regard is a parking assistance service for vehicle parking assistance. An agent goes to a delivery position for a vehicle, temporarily borrows the vehicle, and parks the vehicle. In the above-described parking assistance service operation, there may be a case where a service user is on the move while searching for the vehicle delivery place and the destination of the agent is unclear. As described above, delivery place non-determination may hinder the agent from discovering the service user's vehicle and having the vehicle delivered with smoothness.

Even if the delivery position is determined in advance, there may be a case where the delivery place is, for example, a large parking lot in which a vehicle cannot be discovered with ease due to a plurality of stopped vehicles and a case where the vehicle may stop at a place other than the planned delivery place for various circumstances. Also in these cases, it may take time for an agent to discover a vehicle.

The disclosure provides a parking assistance service management device, an agent terminal, a management method, and a non-transitory computer-readable storage medium storing a program managing the parking assistance service allowing an agent to easily discover a vehicle that he or she is to park on behalf of a driver.

The gist of the disclosure lies in receiving position information on a vehicle from a service user's terminal and transferring the position information to an agent's terminal in a parking assistance service in which the agent provides parking assistance for the service user's vehicle.

A first aspect of the disclosure relates to a parking assistance service management device that manages a parking assistance service in which an agent provides parking assistance for a vehicle of a service user. The parking assistance service management device includes a reception unit configured to receive user information including information indicating a position of the vehicle from a terminal of the service user, a specifying unit configured to specify a terminal of the agent providing the parking assistance for the vehicle based on the user information, and a transmission unit configured to transmit the information indicating the position of the vehicle to the terminal of the agent.

In the parking assistance service management device according to the first aspect of the disclosure, the specifying unit specifies the terminal of the agent, which corresponds to the position to which the vehicle should be transferred based on the user information and transmits the information indicating the position of the vehicle to the terminal of the agent. As a result, the agent is capable of moving with the agent's destination by referring to the information indicating the position of the vehicle and searching for the vehicle to be delivered. Accordingly, the agent can easily discover the vehicle that the agent is to park on behalf of the service user by acquiring the information indicating the position of the vehicle.

In the parking assistance service management device according to the first aspect of the disclosure, the vehicle may be on the move to the delivery place or may remain stopped at the delivery place. In either case, the information indicating the position of the vehicle is capable of contributing to the agent to discover the vehicle easily. When the vehicle is on the move to the delivery place, the delivery place may be already determined or may have not been determined. In the parking assistance service management device according to the first aspect of the disclosure, the specifying unit and the transmission unit may perform processing for transmitting, to the terminal of the agent, the information indicating the position of the vehicle. The information is repeatedly acquired from the terminal of the service user. According to the above, a vehicle position tracking (hereinafter, also referred to as tracking) result is provided for the agent via the terminal of the agent, and thus the agent can discover the vehicle easily.

In the parking assistance service management device according to the first aspect of the disclosure, the transmission unit may transmit, to the terminal of the agent, information for specifying the vehicle to be displayed on a display of the terminal of the agent. The information for specifying the vehicle to be displayed on the display of the terminal of the agent is information that can be recognized from the appearance of the vehicle and at least one selected from, for example, the type of the vehicle, its vehicle number (vehicle registration number), its color (body color), and its appearance-related characteristics (such as the presence and colors of predetermined parts (such as a rear spoiler, an air intake, a roof carrier, a roof box, and a spare tire), the shapes and positions of predetermined parts (such as a light, a tail lamp, a front grill, a bumper, and an antenna), the presence of a special paint (different painting or image drawing), pasting of a sticker, and an object (mark) at an in-vehicle position that is visible through its rear window or windshield). The appearance-related characteristics may be those present during a normal vehicle use or those prepared (installed, pasted, disposed, and so on) for agent to discover the vehicle during the use of the parking assistance service. The vehicle-specifying information facilitates vehicle discovery by the agent. Conceivable as an example is a sticker or a magnet sheet that indicates a parking assistance service user being pasted at a conspicuous part of the vehicle during the use of the parking assistance service.

The parking assistance service management device according to the first aspect of the disclosure may further include a selection unit configured to select, based on the position of the vehicle and positions of a plurality of agent candidates, an agent to provide the parking assistance for the vehicle from the agent candidates. According to the above, vehicle discovery by an agent is facilitated by, for example, one who can reach the position of the vehicle quickly (within a short time) being selected from the agent candidates. For example, the agent candidate that is closest to the position of the vehicle among the agent candidates may be selected as the agent. For example, the closest one may be selected or those having distances from the position of the vehicle shorter than a predetermined value may be selected as "those close to the position of the vehicle" and one of the selectees may be selected in accordance with a predetermined rule. Alternatively, the vehicle position and the position of each agent candidate may be acquired twice or more, the movement speed of the vehicle may be acquired along with the movement speed of each agent candidate, the movement speed of the vehicle and the movement speed of each agent candidate may be compared, and the agent may be selected from the agent candidates having movement speeds exceeding the movement speed of the vehicle. Also, the agent may be selected from the agent candidates with a movement direction (obtained from at least two positions) crossing the movement direction of the vehicle (obtained from at least two positions). Also, a future vehicle position may be estimated from the position, the movement speed, and the direction and an agent candidate expected to arrive at the estimated position fast may be selected as the agent.

The parking assistance service management device according to the first aspect of the disclosure may further include an issuing unit configured to issue enablement data for allowing the agent to operate the vehicle by using the terminal of the agent to the terminal of the agent. The enablement data is data for allowing the agent to operate the vehicle by using the terminal of the agent. For example, the "enablement data" may be data that can be executed by a computer (that is, a program) or data that cannot be executed by a computer. The "enablement data" may be data for proving that one is allowed to operate the vehicle, data for activating a device or a program used for a vehicle operation, the vehicle operation program itself, or data other than the above. For example, the enablement data includes authentication information that an in-vehicle unit uses for authentication of the terminal of the agent and puts the vehicle into a state where the vehicle can be operated by the agent once the authentication is successful.

In a case where the parking assistance service management device includes the issuing unit, the parking assistance service management device is capable of adopting a configuration including a first server device provided with the reception unit, the specifying unit, and the transmission unit and a second server device provided with the issuing unit. According to the above, load dispersion can be performed, without a rise in load with respect to the agent, such that processing related to service user and agent management and processing related to enablement data issuance are performed by different servers.

A second aspect of the disclosure relates to an agent terminal used by an agent in a parking assistance service in which the agent provides parking assistance for a vehicle of a service user. The agent terminal includes a position information reception unit configured to receive information indicating a position of the vehicle, the information being received from a terminal of the service user and transmitted to the terminal of the agent by a parking assistance service management device, and a display controller configured to display, on a display device, the position of the vehicle based on the information indicating the position of the vehicle.

In the agent terminal according to the second aspect of the disclosure, the display controller may display information for specifying the vehicle on the display device, the information being received from the parking assistance service management device. In this case, the agent can search for the vehicle based on the vehicle-specifying information displayed on the display device, and thus vehicle discovery can be facilitated. In the agent terminal according to the second aspect of the disclosure, the display controller may display, on the display device, a map indicating the position of the vehicle based on map data and the information indicating the position of the vehicle. According to the above, the agent can intuitively grasp the vehicle position, and thus vehicle discovery can be facilitated. In the agent terminal according to the second aspect of the disclosure, the display controller may display a path from a position of the agent terminal to the position of the vehicle on the display device. In this case, the vehicle can be tracked and discovered by the agent moving in accordance with path information. In other words, vehicle discovery can be facilitated.

The agent terminal according to the second aspect of the disclosure may further include an enablement data reception unit configured to receive enablement data issued by the parking assistance service management device, the enablement data being for allowing the agent to operate the vehicle by using the terminal of the agent, and a supply unit configured to supply the enablement data to an in-vehicle unit provided in the vehicle, the in-vehicle unit being configured to receive the enablement data and put the vehicle into a state where the agent is allowed to operate the vehicle. In this case, the agent is allowed to operate the vehicle by the enablement data being supplied to the in-vehicle unit. As a result, a physical key such as an electronic key is unnecessary for vehicle delivery, and the agent can operate the vehicle by using the terminal of the agent even without directly meeting with a service user for delivery.

In the agent terminal according to the second aspect of the disclosure, the supply unit may supply the in-vehicle unit with the enablement data including authentication information for the in-vehicle unit to authenticate the agent terminal and to put the vehicle into the state where the agent is allowed to operate the vehicle once the authentication is successful. The supply unit is capable of adopting a configuration for supplying the authentication information to the in-vehicle unit by short-range wireless communication. Once the authentication is successful, the supply unit supplies the authentication information to the in-vehicle unit performing the same operation as a smart key of the vehicle. According to the second aspect of the disclosure, the agent terminal is used as an authentication information supply device, and thus the in-vehicle unit performs the same operation as the smart key. As a result, the agent can perform vehicle operations such as vehicle unlocking and engine start.

A third aspect of the disclosure relates to a management method for managing a parking assistance service in which an agent provides parking assistance for a vehicle of a service user. The management method includes receiving, by a processor, user information including information indicating a position of the vehicle from a terminal of the service user, specifying, by the processor, a terminal of the agent providing the parking assistance for the vehicle based on the user information, and transmitting, by the processor, the information indicating the position of the vehicle to the terminal of the agent.

A fourth aspect of the disclosure relates to a non-transitory computer-readable storage medium storing a program for managing a parking assistance service in which an agent provides parking assistance for a vehicle of a service user. The program causes a computer to execute a step of receiving user information including information indicating a position of the vehicle from a terminal of the service user, a step of specifying a terminal of the agent providing the parking assistance for the vehicle based on the user information, and a step of transmitting the information indicating the position of the vehicle to the terminal of the agent.

According to the aspects of the disclosure, a vehicle that an agent parks on behalf of a driver can be discovered with ease.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5 is a table illustrating a data structure example of a user database (user DB);

FIG. 6 is a table illustrating a data structure example of an agent database (agent DB);

FIG. 7 is a flowchart illustrating the flow of processing at a time of user registration on the user terminal;

FIG. 17 is a sequence diagram illustrating a use application-to-enablement information acquisition flow according to the second embodiment.

DETAILED DESCRIPTION OF EMBODIMENTS

Hereinafter, embodiments will be described with reference to accompanying drawings. The configurations of the embodiments are examples, and the disclosure is not limited to the configurations of the embodiments.

First Embodiment

System Configuration

Figure 1:
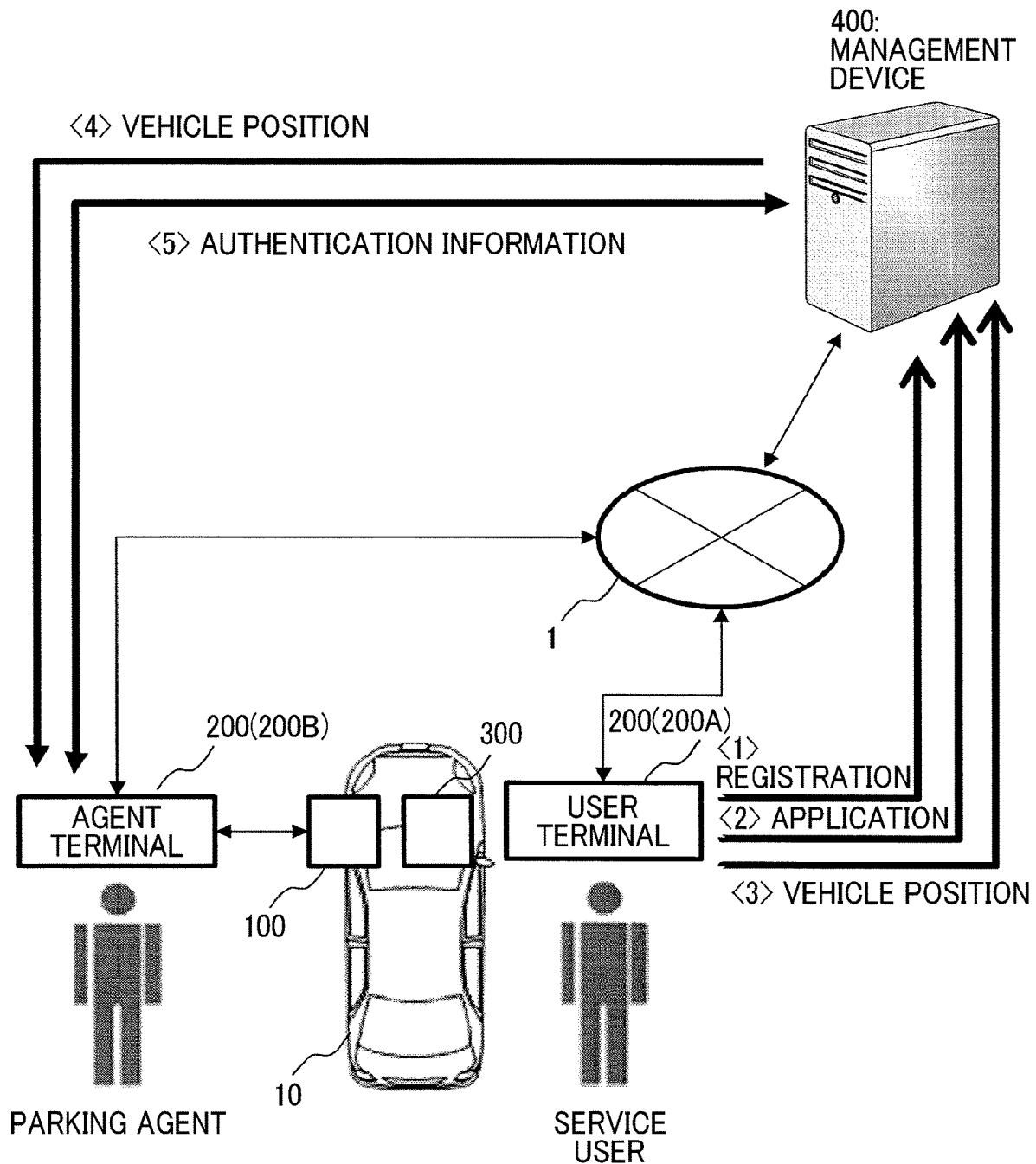
FIG. 1 is a system overview of a parking assistance service according to a first embodiment.

FIG. 1 is a system overview of a parking assistance service according to a first embodiment. In FIG. 1, a system includes a user terminal 200A, an agent terminal 200B, and a management device 400, which are connected to a network 1. The network 1 is, for example, a worldwide public communication network such as the Internet, and a wide area network (WAN) or another communication network can be adopted as the network 1. The network 1 may include a cellular network such as the Long Term Evolution (LTE) and a wireless network such as a wireless local area network (LAN: including Wi-Fi).

The user terminal 200A is a terminal device of a service user who uses the parking assistance service and is an example of a "service user terminal". The user terminal 200A may be a smart device such as a feature phone, a smartphone, and a tablet terminal, a portable terminal (portable communication terminal) such as a personal digital assistant (PDA) and a wearable computer, or an in-vehicle terminal provided in a vehicle 10 of the service user.

The agent terminal 200B is a terminal device of an agent who provides parking assistance for the vehicle 10 of the service user and is an example of an "agent terminal". The agent terminal 200B may be the same portable or in-vehicle terminal as the user terminal 200A. The user terminal 200A and the agent terminal 200B may also be devices other than the above-described portable terminal and in-vehicle terminal insofar as the user terminal 200A and the agent terminal 200B are movable and capable of communicating with the management device 400 via the network 1. As an example, in the first embodiment, a case where the user terminal 200A and the agent terminal 200B are portable terminals will be described. In the following description, a "portable terminal 200" will be used in a case where the user terminal 200A and the agent terminal 200B are mentioned as a portable terminal without distinguishment.

The vehicle 10 is provided with a smart key system including a locking and unlocking device 300 and a key unit 100. The locking and unlocking device 300 gives a unique ID to a portable device (hereinafter, also referred to as an electronic key) that performs wireless communication with the vehicle 10. The locking and unlocking device 300 allows a door to be unlocked and an engine to be started in a case where the ID obtained by communication and the ID pre-registered in the vehicle 10 match each other. The key unit 100 is a device that allows locking and unlocking of the vehicle 10 using the portable terminal 200 instead of the electronic key without entailing remodeling of the vehicle 10. The key unit 100 is placed at a predetermined position in the vehicle (in, for example, a glove compartment). The key unit 100 is supplied with electric power from the battery of the vehicle 10 or a secondary battery. The key unit 100 operates as an electronic key and allows the door to be unlocked, the engine to be started, and so on in a case where vehicle operation enablement data (data for temporarily enabling an operation of the vehicle 10 such as unlocking of the vehicle 10 and engine start: such as authentication information) is obtained from the portable terminal 200.

The management device 400 is an example of a "parking assistance service management device". The management device 400 performs, for example, service user information (hereinafter, referred to as user information) and agent information (hereinafter, referred to as agent information) management, user registration processing, service use reception processing, and processing for receiving information indicating the position of the vehicle 10 from the user terminal 200A and transferring the information to the agent terminal 200B. The management device 400 operates as an enablement data issuing device issuing enablement data, which is data for enabling an operation of the vehicle 10 by using the agent terminal 200B.

Flow of Parking Assistance Service

Figure 2:
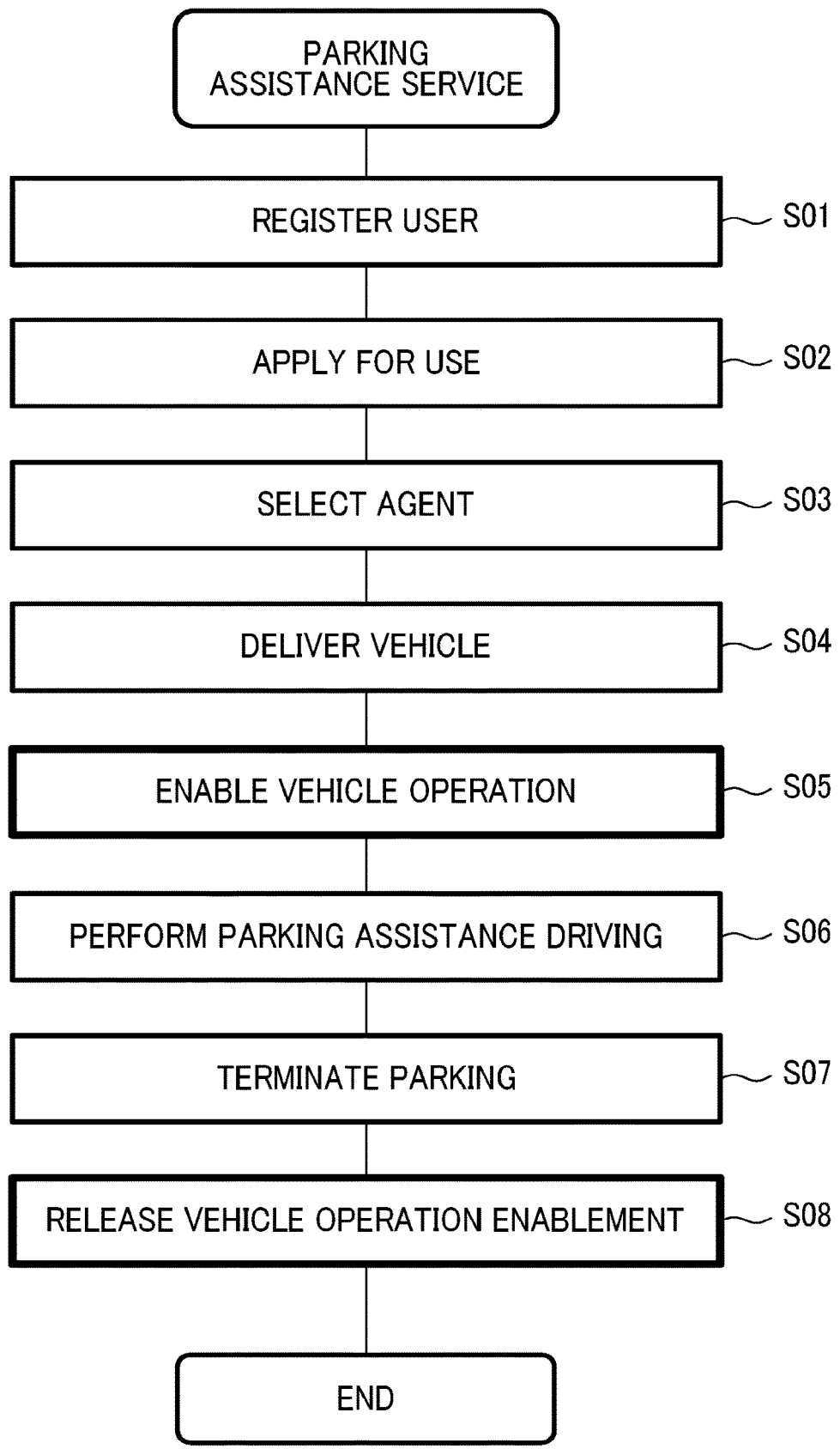
FIG. 2 is a flowchart illustrating the flow of the parking assistance service.

FIG. 2 is a flowchart that illustrates the flow of the parking assistance service. A person who wishes to use the parking assistance service accesses a parking assistance service operation site and performs a user registration procedure to become a member of the parking assistance service (hereinafter, also referred to as a service user) (S01). Subsequently, in a case where a demand for the service occurs, the service user makes a service use application to an administrator (S02). In the system according to the first embodiment, reception of the above-described user registration and service use application is performed by the user terminal 200A transmitting information related to the user registration and use application to the management device 400 (<1> and <2> in FIG. 1). The above-described registration and application can also be performed by a customer with respect to the administrator by telephone, fax, e-mail, or mail.

The administrator receives the application and selects a parking agent (S03). Although the agent selection may be manually performed, the management device 400 automatically performs the agent selection in the system according to the first embodiment. The selected agent goes to a vehicle delivery place and receives vehicle delivery (S04). The agent receives operation enablement data (authentication information) for the vehicle 10 from the management device 400 with the agent terminal 200B (<5> in FIG. 1) and supplies the enablement data to the key unit 100 of the vehicle 10 (S05). In the first embodiment, the authentication information is used as an example of the enablement data. By the authentication information being supplied, the key unit 100 operates as an electronic key in the smart key system, and the agent can unlock the vehicle 10, start the engine, and drive the vehicle 10. As described above, the service user does not have to deliver the electronic key, and thus the service user does not have to be in the delivery place. The agent drives the vehicle 10 (S06) and moves the vehicle 10 to and parks the vehicle 10 at a parking place or a parking position designated by the service user (S07). Once the parking is completed, the operation enablement for the vehicle 10 is released by, for example, invalidation of the authentication information (S08).

In the system according to the first embodiment, the management device 400 receives the information indicating the position of the vehicle 10 from the user terminal 200A (<3> in FIG. 1) and transfers the information to the agent terminal 200B (<4> in FIG. 1) until the agent reaches the vehicle delivery place. The position of the vehicle is useful information for the agent to discover the vehicle 10. Hereinafter, details of each device that realizes the parking assistance service will be described.

Configuration of Portable Terminal

Figure 3:
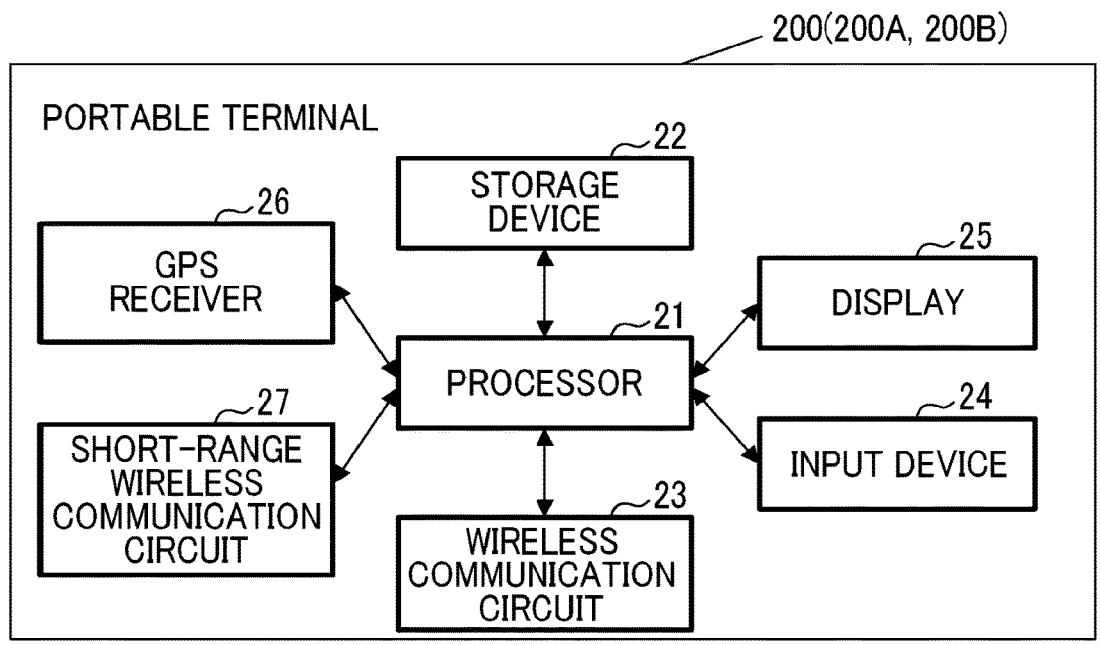
FIG. 3 is a block diagram illustrating a configuration example of a portable terminal that can be used as a service user terminal and an agent terminal.

FIG. 3 illustrates a configuration example of the portable terminal 200 that can be used as the user terminal 200A or the agent terminal 200B. The portable terminal 200 includes a processor 21, a storage device 22, a wireless communication circuit 23, an input device 24, a display 25, a global positioning system (GPS) receiver 26, and a short-range wireless communication circuit 27.

The storage device 22 includes a main storage device and an auxiliary storage device. The main storage device is used as a program and data storage region, a program development region, a program work region, a communication data buffer region, and the like. The main storage device is configured by a random access memory (RAM) or a combination of a RAM and a read only memory (ROM). The auxiliary storage device is used as a data and program storage region. The auxiliary storage device includes a nonvolatile storage medium such as a hard disk, a solid state drive (SSD), a flash memory, and an electrically erasable programmable read-only memory (EEPROM).

The wireless communication circuit 23 administers wireless communication complying with a wireless communication method supported by the portable terminal 200 (such as the LTE and a wireless LAN (WiFi)). The input device 24 includes a key, a button, a pointing device, a touch panel, and so on, and is used for information input. The display 25 is, for example, a liquid crystal display and displays information and data. The GPS receiver 26 receives a signal from a GPS satellite and calculates the position of the portable terminal 200. The short-range wireless communication circuit 27 administers short-range wireless communication complying with a predetermined short-range wireless communication standard (such as the Near Field Communication (NFC), the Bluetooth (registered trademark) Low Energy (BLE), the Ultra-wideband (UWB), and the Zigbee).

The processor 21 is, for example, a central processing unit (CPU). The processor 21 operates the portable terminal 200 as the user terminal 200A and the agent terminal 200B by executing various programs stored in the storage device 22.

Configuration of Management Device

Figure 4:
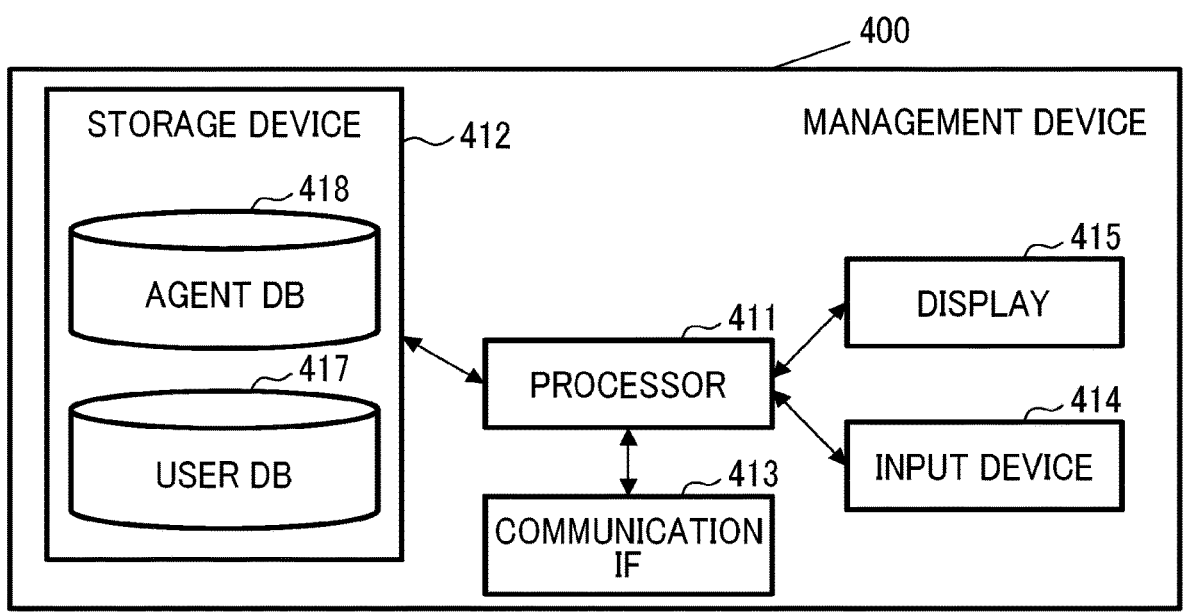
FIG. 4 is a block diagram illustrating a configuration example of a management device.

FIG. 4 is a block diagram that illustrates a configuration example of the management device 400. The management device 400 can be configured by means of a universal information processing device such as a personal computer and a workstation or a dedicated information processing device such as a server machine. The management device 400 includes a processor 411, a storage device 412, a communication interface (hereinafter, referred to as a communication IF) 413, an input device 414, a display 415, a user database (hereinafter, referred to as a user DB) 417, and an agent database (hereinafter, referred to as an agent DB) 418.

Applicable as the processor 411, the storage device 412, the input device 414, and the display 415 are those similar to the examples described with regard to the processor 21, the storage device 22, the input device 24, and the display 25, respectively. However, depending on differences in terms of the purpose of use and applications, those that are different in performance from those applied to the portable terminal 200 are applied.

The communication IF 413 administers communication processing. A network interface card (NIC) or the like can be applied as the communication IF 413. The communication IF 413 transmits and receives data and information to and from the user terminal 200A and the agent terminal 200B via the network 1. By executing various programs stored in the storage device 412, the processor 411 operates the management device 400 as the parking assistance service management device and the enablement data issuing device.

In a case where the management device 400 operates as the parking assistance service management device, the communication IF 413 and the processor 411 operate as reception units (acquisition units) that receive user information including the position information of the vehicle 10 from the user terminal 200A. The processor 411 and the communication IF 413 operate as transmission units that transmit information indicating the position of the vehicle 10 to the agent terminal 200B. The processor 411 operates as a specifying unit that specifies the agent terminal 200B providing parking assistance for the vehicle 10 based on service user-related information.

At least a part of the processing that is performed by the processor 21 and the processor 411 may be executed by a non-CPU processor such as a digital signal processor (DSP) and a graphics processing unit (GPU), a dedicated or universal integrated circuit such as an application specific integrated circuit (ASIC) and a field programmable gate array (FPGA), or a combination of a processor and an integrated circuit. The combination is referred to as a microcontroller unit (MCU), a system-on-a-chip (SoC), a system large-scale integration (LSI), a chipset, or the like.

Description of DB

The user DB 417 stores user information. The agent DB 418 stores agent-related information (hereinafter, referred to as agent information). The information stored in the user DB 417 and the agent DB 418 is stored in the storage device 412.

FIG. 5 is a table that illustrates a data structure example of the user DB 417. In the user DB 417, personal information on a user, vehicle information, key unit information, and service use-related information are stored in association with a user ID, which is service user identification information.

The personal information on the user includes the service user's name, contact information (such as his or her address, phone number, and mail address), and user terminal information and the like. The user terminal information is information for communication between the management device 400 and the user terminal 200A. The user terminal information includes, for example, the Internet protocol (IP) address and the media access control (MAC) address of the user terminal 200A. Personal information on the user other than those exemplified above may be further included as well. The personal information on the user is stored in the user DB 417 mainly by user registration.

The vehicle information is information for visually identifying the vehicle 10. Examples of the vehicle information include the type of the vehicle, its vehicle number (vehicle registration number), and its color (such as its painted color: body color). In addition to the above, the vehicle information may include features useful for an agent to discover the vehicle 10. The characteristic information can include information contributing to identification of the vehicle 10 such as the presence of optional parts (such as a roof carrier, a roof box, and a spare tire), the presence of a special paint (different painting or image drawing), and pasting of a sticker. The vehicle information is stored in the user DB 417 when the use of the service is applied for. Alternatively, the vehicle information may be stored during user registration. Alternatively, the vehicle information registration is optional.

The key unit information is information related to the key unit 100 placed in the vehicle 10 and is used for issuing authentication information suitable for the key unit 100. Although the service user registers the personal information on the user and the vehicle information described above in the first embodiment, it is also possible for a vehicle seller to register a part or the whole of the personal information on the user and the vehicle information described above on behalf of the user before vehicle delivery.

The service use-related information is information related to the use of the service and includes, for example, the date and time of use, a delivery place for the vehicle 10, and a place where the vehicle 10 is desired to be parked by the agent (hereinafter, referred to as a destination). Information received from the user terminal 200A and indicating the position of the vehicle 10 may also be stored as the service use-related information. In the user DB 417, an agent ID associated with the user ID is registered as information indicating the correspondence relationship between the user and the agent.

FIG. 6 is a table that illustrates a data structure example of the agent DB 418. In the agent DB 418, personal information on the agent and status information are stored in association with the agent ID, which is agent identification information. The personal information on the agent includes the agent's name and contact information (such as his or her address, phone number, and mail address) and agent terminal information. The agent contact information is used for individual contact with the agent. The agent terminal information includes, for example, the IP address and the MAC address of the agent terminal 200B and is used for the position of the vehicle 10 to be transferred to the agent terminal 200B.

The status information includes the respondability of the agent, a location area, position information, and a movement speed. Further information items may be included as well. The respondability of the agent is information indicating whether or not each agent can undertake parking assistance. In a case where the agent is already dispatched or off duty, the respondability is set to "non-respondable (NG)". In a case where the agent is not dispatched and on duty, the respondability is set to "respondable (OK)". The location area indicates the geographical area to which the current position of the agent (agent terminal 200B) belongs. The geographical area may be an administrative district or may be an area partitioned in accordance with an appropriate rule by the administrator. The geographical area is used for primary screening in the agent selection according to the first embodiment. The position information indicates the position information of the agent terminal 200B. The movement speed indicates the average movement speed of the agent obtained from the position information. The number of samples used for the average movement speed calculation can be appropriately selected. The position information and the movement speed are used for secondary screening in the agent selection according to the first embodiment. In the agent DB 418, the user ID associated with (tied to) the agent ID can be registered as information indicating the correspondence relationship between the user and the agent. Still, the registration of the user ID associated with the agent ID is an option in the case of also assuming acquisition of a corresponding user ID by means of the agent ID.

Example of Operation During User Registration

Figure 8:
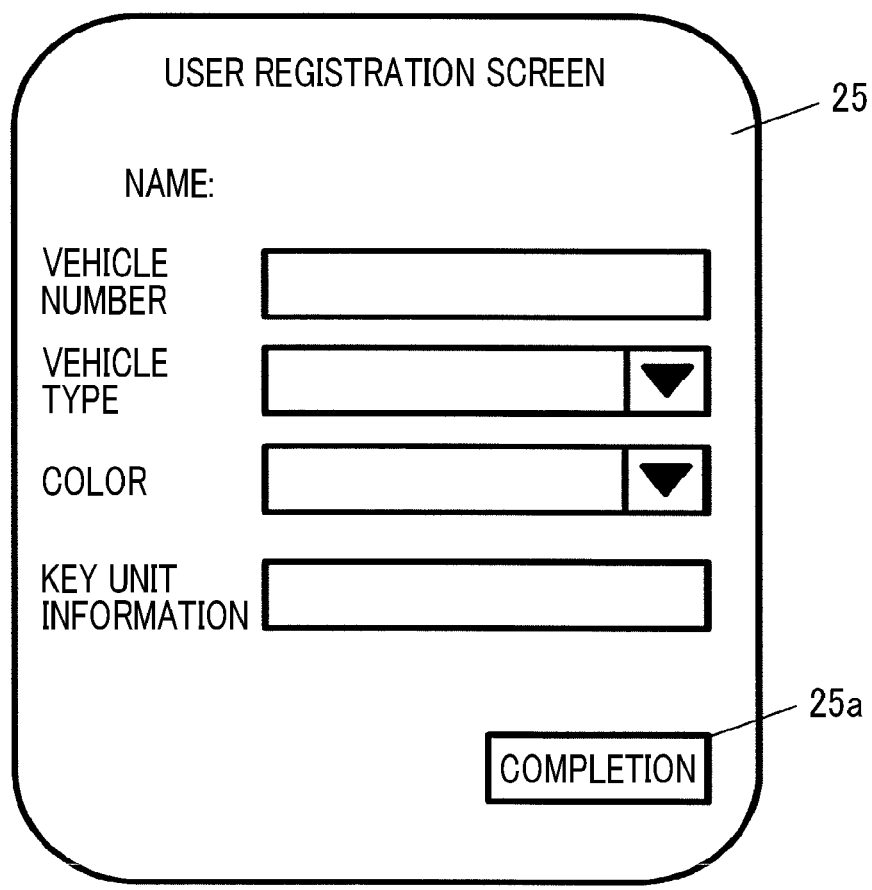
FIG. 8 is a diagram illustrating a user registration screen example.
Figure 9:
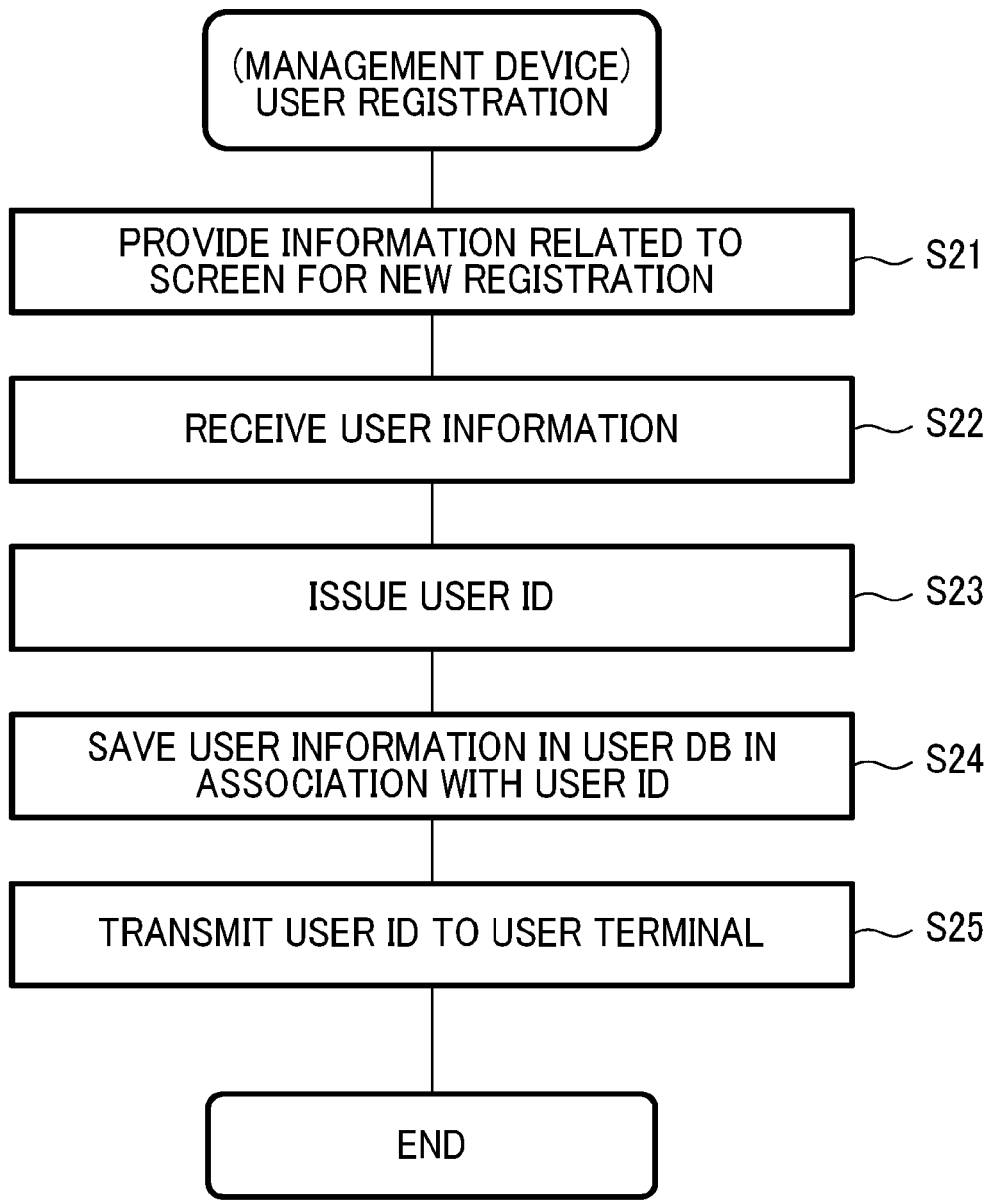
FIG. 9 is a flowchart illustrating the flow of processing at the time of user registration on the management device.

Operation examples regarding the user terminal 200A and the management device 400 during service user registration (new registration: <1> in FIG. 1 and S01 in FIG. 2) will be described below. FIG. 7 is a flowchart illustrating the flow of processing during user registration on the user terminal. FIG. 7 illustrates processing performed by the processor 21 (FIG. 3) of the user terminal 200A. FIG. 8 is a diagram that illustrates a user registration screen example. FIG. 9 is a flowchart illustrating the flow of processing during user registration on the management device.

As illustrated in FIG. 7, in a case where the user wishes to perform user registration, the user accesses the management device 400 (hereinafter, also referred to as an operation site) by using the user terminal 200A (S11). In S11, the user terminal 200A establishes a communication session with the management device 400 via the network 1, and enters a state where information and data can be transmitted and received by means of the communication session. The management device 400 provides information related to a new registration screen with respect to the access from the user terminal 200A (S21 in FIG. 9). The user terminal 200A is capable of displaying, on the display 25, a screen (webpage) based on the screen information that is transmitted from the operation site by executing a browser in a program. A dedicated application installed in the user terminal 200A may be used for the screen display of the information from the operation site.

As illustrated in FIG. 8, the user registration screen that is displayed on the display 25 has an input field for personal information on the user such as the user's name, vehicle information such as a vehicle number, a vehicle type, and a color, and key unit information as user information. The processor 21 receives input of each information piece (S12 in FIG. 7). Once the necessary items are entered into the input field and a completion button 25*a* is pressed, the processor 21 transmits the input user information to the management device 400 (S13 in FIG. 7). Upon receiving the user information (S22 in FIG. 9), the processor 411 of the management device 400 issues the user ID as an "issuing unit" (S23 in FIG. 9) and stores the user information in the user DB 417 in association with the user ID (S24 in FIG. 9). As an example of the user terminal information, the transmission source IP address of a packet used for the user information transmission is registered in the user DB 417. The user ID may be information unique to the user. The management device 400 generates the user ID and transmits the user ID to the user terminal 200A (S25 in FIG. 9). The processor 21 of the user terminal 200A receives the user ID and stores it in the storage device 22 (S14 in FIG. 7). In this manner, the user registration is completed.

Example of Operation During Service Use Application

Figure 10:
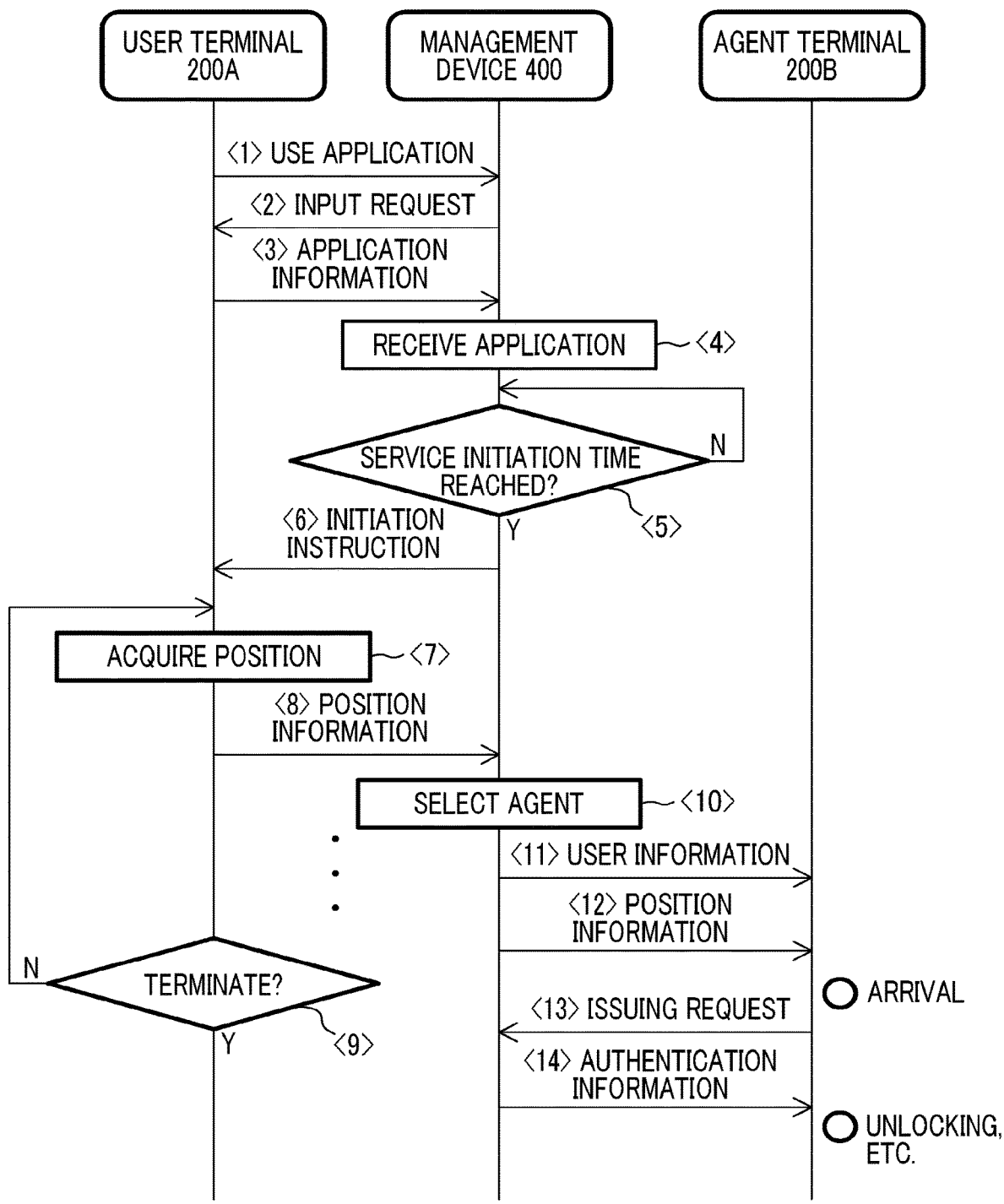
FIG. 10 is a sequence diagram illustrating a use application-to-enablement information acquisition flow.
Figure 11:
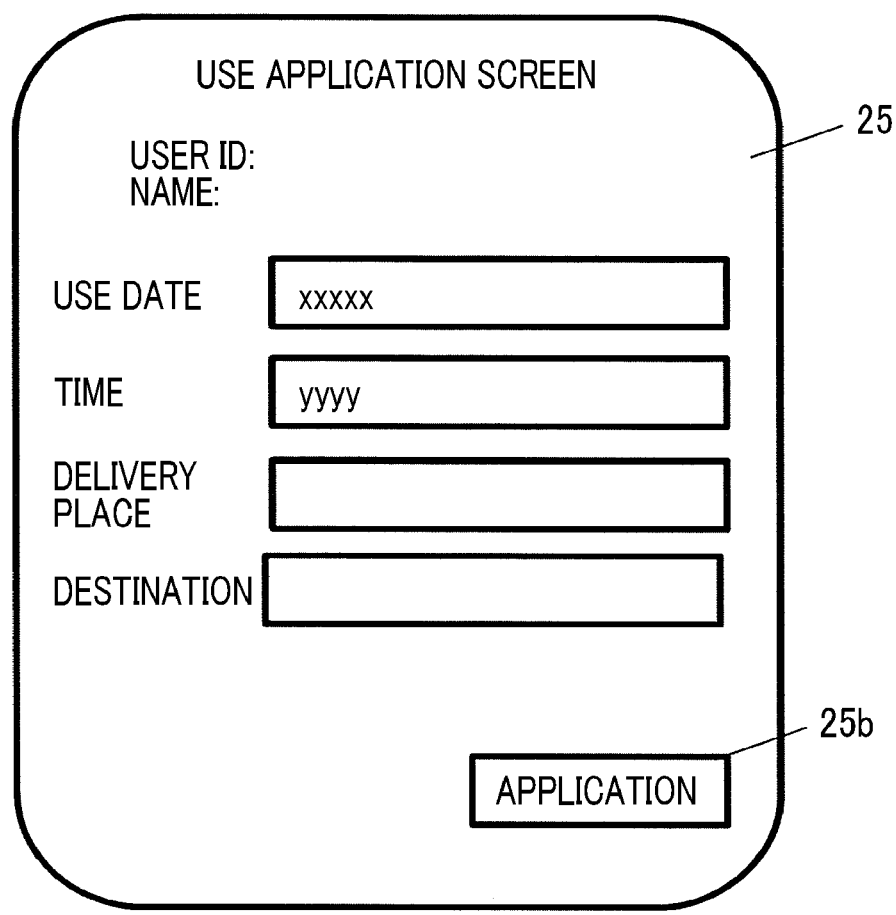
FIG. 11 is a diagram illustrating a use application screen example.

FIG. 10 is a sequence diagram illustrating the flow from an application for the use of the parking assistance service to enablement information acquisition. Once the user terminal 200A accesses the management device 400 (such as a website) and logs in by using the user ID (<1> in FIG. 10: application for use), the management device 400 transmits information on a parking assistance service use application screen to the user terminal 200A (<2> in FIG. 10: input request). The processor 21 of the user terminal 200A displays a use application screen as illustrated in FIG. 11 on the display 25.

The user inputs application information such as the date and time of use, a delivery place, and a destination (parking place) by using the use application screen. In a case where the user wishes to immediately use the service, for example, the date and time of use may be omittable. Once the necessary items are completely entered and an application button 25*b* is pressed, the application information is transmitted to the management device 400 (<3> in FIG. 10: application information).

With the application information received, the processor 411 of the management device 400 performs application information reception processing (<4> in FIG. 10: application reception), registering the application information in the user DB 417 as a part of service-related information and determining a service initiation timing. In this case, the processor 411 determines that the service should be immediately initiated in a case where the application information includes no information on the date and time of use as described above. In a case where the date and time of use are designated (entered), in contrast, the processor 411 determines the service initiation time (preceding the entered time) in accordance with a predetermined rule from the designated date and time of use. The time when the service user heads for the destination by driving the vehicle 10 with the user terminal 200A at hand is estimated as the initiation time.

Acquisition of Information Indicating Vehicle Position

Once the immediate initiation determination is made or the service initiation time is reached (Y in <5> in FIG. 10), the processor 411 of the management device 400 sends an instruction for initiation of position information acquisition and transmission to the user terminal 200A by using the user terminal information of the user DB (<6> in FIG. 10). A push notification regarding the position acquisition and transmission is sent to the user terminal 200A along with the initiation instruction. Here, the service user may recognize the initiation of the service (initiation of an agent movement to the delivery place). The processor 21 of the user terminal 200A receives the initiation instruction, acquires information indicating the position of the user terminal 200A by using a signal that the GPS receiver 26 receives from a GPS satellite (<7> in FIG. 10), and transmits the information to the management device 400 (<8> in FIG. 10). The address of the management device 400 can be obtained by, for example, learning of the address of the transmission source of the initiation instruction. Alternatively, the management device 400 may designate the address of a position information transmission destination with the initiation instruction. The acquisition and transmission of the information indicating the position of the vehicle include a case of being performed with the vehicle 10 on the move to the delivery place for the vehicle 10 and a case where the vehicle 10 remains stopped at the delivery place for the vehicle 10. In a case where an immediate service initiation is determined with no desired date and time of use input in the application, for example, it is assumed that the vehicle 10 with the user terminal 200A therein is on the move while searching for a delivery place. In a case where the application has a desired date and time of use input therein, in contrast, the service user may be waiting for an agent's arrival with the vehicle 10 already stopped at the delivery place by the service user at the initiation of the position information acquisition and transmission.

The position information indicating the position of the vehicle 10 may be obtained from, for example, the correspondence relationship between a geographical area and the cell ID (cell identification information) of a radio base station wirelessly communicating with the user terminal 200A or the correspondence relationship between a geographical area and the reception intensity of radio waves received from a radio base station as well as the above-described method for acquisition based on a satellite positioning system such as a GPS. The cell ID or data regarding the cell ID and the intensity of received radio waves may be sent to the management device 400 as the information indicating the position of the vehicle 10 for geographical position estimation based on analysis in the management device 400. Alternatively, position information obtained from a beacon signal from a roadside unit installed on a road or the like may be sent to the management device 400. In a case where the user terminal 200A itself lacks a position-measuring configuration, the user terminal 200A may acquire the information obtained from a car navigation system provided in the vehicle 10 or a device other than the car navigation system and indicating the position of the vehicle 10 and transmit the information to the management device 400. The position information acquisition and transmission processing performed by the user terminal 200A is repeated until a predetermined termination condition is satisfied (see the loop of <7> to <9> in FIG. 10). The termination condition is, for example, a case where a forced termination instruction is input by the user. The input of the termination instruction is performed in a case where, for example, the vehicle 10 is left with the vehicle 10 stopped at a delivery place. Alternatively, the transmission of the position information may be stopped in response to an instruction from the management device 400. A timer may be set in the user terminal 200A such that, for example, the acquisition and transmission of the information indicating the position of the vehicle 10 is initiated at a timing matching the time of use designated in the application of the user terminal 200A.

Agent Selection Processing

The processor 411 of the management device 400 is capable of selecting an agent from a plurality of agent candidates in accordance with a predetermined rule before the service initiation time or immediately after the service initiation time (in the case of immediate service initiation). In the first embodiment, the processor 411 of the management device 400 operates as a selection unit and selects an agent from a plurality of agent candidates based on the information received from the user terminal 200A and indicating the position of the vehicle 10 (hereinafter, also referred to as the position information on the vehicle 10) and information indicating the position of each agent candidate (position information on each agent candidate) (<10> in FIG. 10).

Figure 12:
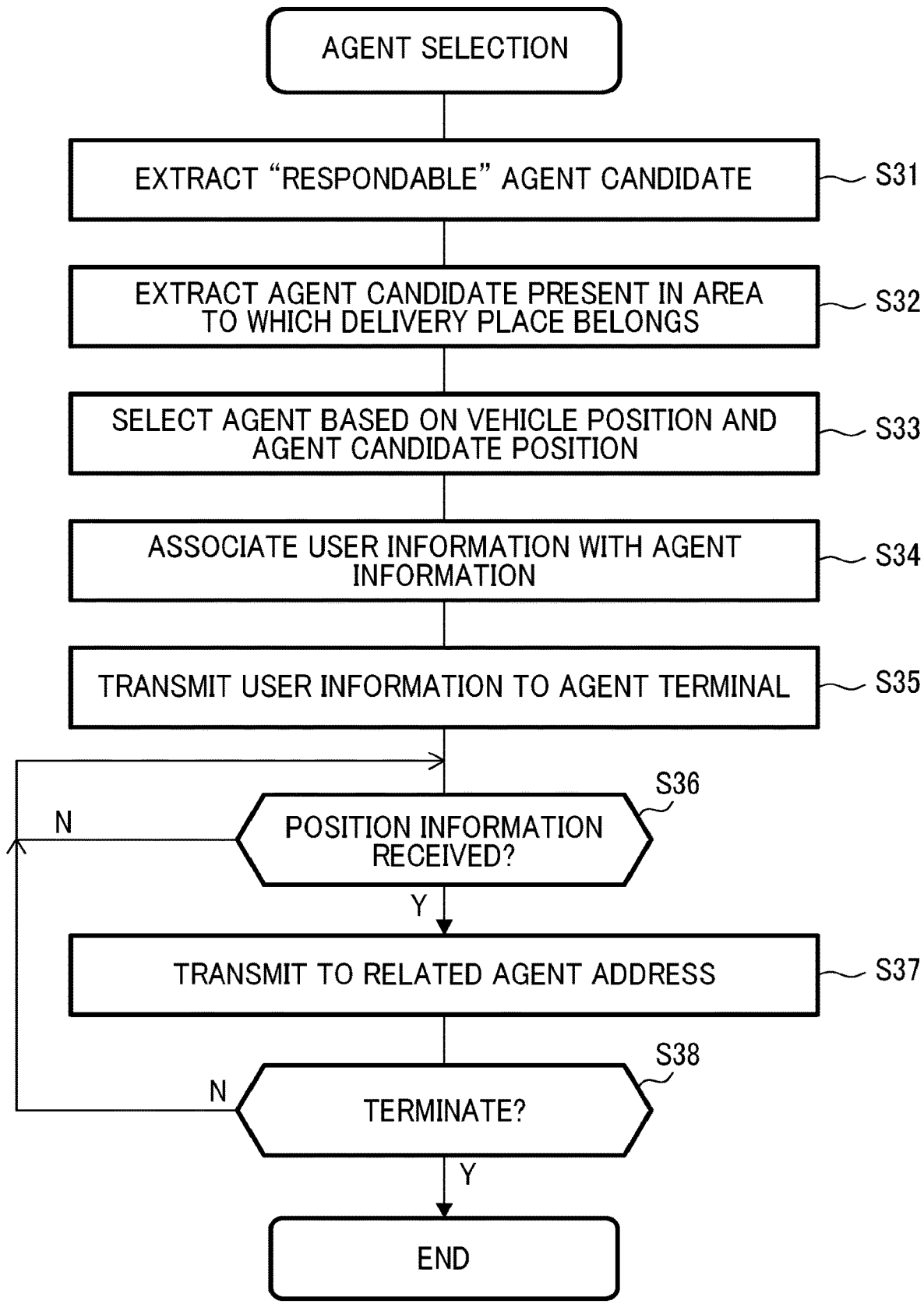
FIG. 12 is a flowchart illustrating the flow of agent selection processing.

FIG. 12 is a flowchart illustrating the flow of the agent selection processing executed by the processor 411 of the management device 400. In order to select an agent to be dispatched to the delivery place from the agent candidates, the management device 400 acquires the position information of the agent terminal 200B from the agent terminal 200B of an agent in a "respondable" state at a predetermined timing and registers the position information in the agent DB 418. Upon detecting the position information from the user terminal 200A, the processor 411 of the management device 400 initiates the processing illustrated in FIG. 12. In S31, the processor 411 refers to the agent DB 418 and extracts the record of a "respondable" agent candidate.

In S32, the processor 411 refers to the user DB 417 and extracts, from the record extracted in S31, the record of an agent candidate present in the same area as the geographical area to which the delivery place of the vehicle 10 belongs. Pre-stored in the user DB 417 are information indicating the correspondence relationship between the geographical area and an address, a phone number, a facility name, and mapped position information input as a delivery place and information indicating the range of the geographical area (such as latitude and longitude information). The processor 411 determines the geographical area to which the delivery place belongs by using the above information. The record of any agent candidate present in the same area as the area to which the delivery place belongs is extracted with reference to the position of each agent candidate in the agent DB 418. This is to select an agent who can quickly reach the delivery place from the agent candidates. The processing proceeds to S33 in a case where no delivery place is registered in the user DB 417. This is to select an agent from a non-delivery place viewpoint. In a case where an agent is selected for a service user designating a delivery place before or immediately after the service initiation time, the processing of S31 and S32 is performed and an agent can be selected from agent candidates corresponding to the record extracted in S32 in accordance with a predetermined rule not using the position information of the vehicle 10 (for example, at random).

In a case where the processing proceeds to S33, an agent is selected based on the position of the vehicle 10 and the position of each agent candidate in the record extracted in S32. For example, the distance between the position of the vehicle 10 and the position of each agent candidate is calculated and one of the agent candidates close to the vehicle 10 is selected as the agent. This is because the agent is regarded as being more likely to catch up with the vehicle 10 and discover the vehicle 10 in the shortest time. However, the closest one does not necessarily have to be selected as the agent, and the second-closest agent candidate or a more distant agent candidate can also be selected in some cases. In a case where a plurality of agent candidates have little difference in distance from the vehicle 10, for example, selection of the one with a smaller difference between the average movement speed of the position of the vehicle 10 (movement speed of the vehicle 10) and the average movement speed of each agent candidate may allow the vehicle 10 to be caught up with more quickly than selection of the closest one. Accordingly, the agent may be selected based on the distance from the position of the vehicle 10 and the difference in average movement speed. Alternatively, average movement speeds and movement directions may be obtained from the history of fluctuations in the position of the vehicle 10, the position after a predetermined time may be estimated, and the agent candidate that can reach the estimated position in the shortest time may be selected as the agent. Calculation of the distance between the position of the vehicle 10 and the position of each agent candidate may be a linear distance on a map or the distance of a way taking a path into account.

In S34, the processor 411 associates service user information with agent information on the agent selected in S33. The association is performed by, for example, association between the user ID of the service user and the agent ID of the agent. For example, the processor 411 registers the agent ID of the agent in the record of the service user in the user DB 417. As a result, the user ID and the agent ID are associated with each other. In the first embodiment, it is assumed that the corresponding agent ID is acquired by means of the user ID. In S35, the processor 411 transmits the user information (at least the user ID) to the agent terminal 200B by using the agent terminal information (such as the IP address of the agent terminal 200B (hereinafter, referred to an agent address)) included in the agent information (agent information in the agent DB 418 corresponding to the agent ID associated with the user ID) associated with the user information.

In S36, the processor 411 waits for the position information on the vehicle 10 transmitted from the user terminal 200A. The user terminal 200A transmits information including the position information on the vehicle 10 and the user ID (example of "user information including information indicating the position of the vehicle"). Upon acquiring the information including the user ID and the position information on the vehicle 10 received by the communication IF 413 of the management device 400, the processor 411 acquires the agent ID corresponding to the user ID by referring to the user DB 417, acquires the agent terminal information corresponding to the agent ID (hereinafter, also referred to as an agent address) from the agent DB 418, and transmits the position information on the vehicle 10 together with at least the user ID to the agent address (S37). As described above, information indicating the position of the vehicle 10 of the service user is transferred to the agent terminal 200B via the management device 400.

The user terminal 200A repeatedly (regularly or periodically) acquires the position information on the vehicle 10 and transmits the information to the management device 400 together with the user ID. The processor 411 performs the processing for transferring the position information on the vehicle 10 (S36 and S37) every time the position information on the vehicle 10 is received (hereinafter, also referred to as acquisition) from the user terminal 200A. The transfer processing as described above is repeated until a predetermined termination trigger occurs (loop of S36 to S38). The termination trigger can depend on termination of the position information acquisition and transmission. For example, it is possible to terminate the loop processing based on, as a trigger, the position information non-reception time continuing for a predetermined time. Although an example in which the user terminal 200A actively performs position information acquisition and transmission to the management device 400 has been described in the first embodiment, the management device 400 may transmit a position information transmission request to the user terminal 200A and the user terminal 200A may acquire and transmit position information in response to the transmission request instead.

As a result of the processing illustrated in FIG. 12, service user information is transmitted to the agent terminal 200B (S35, <11> in FIG. 10) and information indicating the position of the vehicle 10 is transferred to the agent terminal 200B (S37, <12> in FIG. 10). During the transmission of the user information and the information indicating the position of the vehicle 10, the processor 411 of the management device 400 operates as a specifying unit and is capable of specifying the agent terminal 200B of the agent providing parking assistance for the vehicle 10 by using the agent ID stored in the user DB 417 based on the user information (such as the user ID).

Processing on Agent Terminal

By the agent terminal 200B receiving the user information, the agent finds that he or she has been selected as the parking agent for the vehicle 10. Then, the agent moves to the delivery place for the vehicle 10 by using the position of the transferred vehicle 10 as a clue. The agent may move on foot or may use a moving vehicle (including a two-wheeled vehicle and a bicycle) and another means for moving. The vehicle of the agent may be driven by the agent or a companion. For example, it is desirable that the agent visits the delivery place with a companion by means of a moving vehicle and the companion picks up the agent with the moving vehicle after parking assistance for the vehicle 10.

Figure 13:
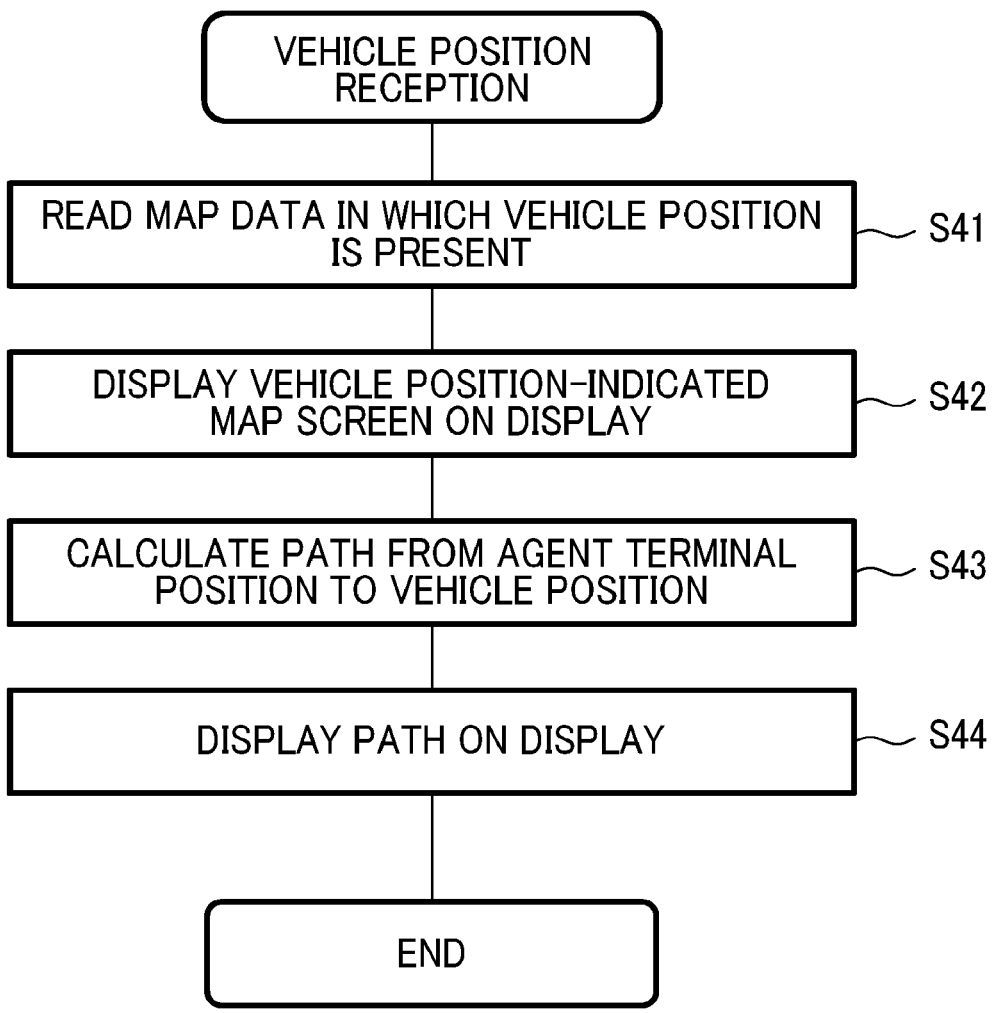
FIG. 13 is a flowchart illustrating a processing example at a time of position information reception by the agent terminal.

FIG. 13 is a flow chart that illustrates a processing example at a time of position information reception on the agent terminal. A navigation (guide) application is installed in the storage device 22 of the agent terminal 200B, and the processor 411 executes the application. As a result of the execution of the application, the communication IF 413 operates as a "position information reception unit", and the processor 411 performs the following processing as a display controller. The storage device 22 stores geographical map data handled by the application. Map data regarding the area where the position of the vehicle 10 is present is read (S41) and a screen on which the position of the vehicle 10 is superimposed (example of a "vehicle position-indicating map") is displayed on the display 25 (example of the "display device") (S42). The processor 21 calculates a path from the position of the agent terminal to the position of the vehicle by executing the application (S43) and displays the path on the display (S44). As a result, the agent can efficiently approach the vehicle 10 by relying on the displayed path. It is also possible that the management device 400 creates a screen showing data on a map screen on which the position of the vehicle 10 is superimposed and the result of the path calculation and transmits the screen to the agent terminal 200B. In this case, navigation application and map data storage by the agent terminal 200B is avoided. Alternatively, the agent terminal 200B may transfer the position of the vehicle 10 to navigation equipment different from the agent terminal 200B. Alternatively, the position of the vehicle 10 may be manually input to navigation equipment, the navigation equipment may calculate the position of the vehicle as a destination, and the agent may move to the position of the vehicle 10 by relying on a displayed path.

As a result of the agent tracking the vehicle 10 based on the position of the vehicle 10, the agent catches up with the vehicle 10. In a case where the agent discovers the vehicle on the move to the delivery place, the agent follows the vehicle 10 to the delivery place for the vehicle 10 and receives the delivery of the vehicle 10 after the vehicle 10 is stopped at the delivery place. As a matter of course, also possible is a method in which the agent discovers the vehicle 10 stopped at the delivery place by using the position information as a clue and receives the delivery. Once the agent arrives at the delivery place where the vehicle 10 is stopped, the agent operates the agent terminal 200B and transmits an authentication information issuing request to the management device 400 (<13> in FIG. 10). The agent terminal 200B is capable of obtaining the address of the management device 400 by learning of the addresses of user and position information transmission source. Alternatively, the management device 400 may designate the address of an issuing request transmission destination.

Upon receiving the issuing request, the management device 400 acquires authentication information (pre-stored in, for example, the storage device 412) corresponding to key unit information by referring to the key unit information of the service user in the user DB 417 and transmits the authentication information to the agent terminal 200B (<14> in FIG. 10). The wireless communication circuit 23 of the agent terminal 200B receives the authentication information as enablement data from the management device 400 as an "enablement data reception unit". The processor 21 of the agent terminal 200B operates as an enablement data "supply unit" and transmits (hereinafter, also referred to as supply) the authentication information (example of the "enablement data") received from the management device 400 to the key unit 100 (example of an "in-vehicle unit"). As a result, the key unit 100 operates as an electronic key. As a result, a door lock of the vehicle 10 is released and the engine is started by the engine start button in the vehicle 10 being pressed. In other words, the vehicle 10 is ready for operation.

The agent opens a door of the vehicle 10, starts the engine, drives the vehicle 10, and heads for the destination (parking place for the vehicle 10). Once the vehicle 10 is stopped at the destination, the agent comes out of the vehicle 10 and performs predetermined invalidation processing. As a result of the invalidation processing, the key unit 100 stops operating as the electronic key. Then, the operation enablement state of the vehicle 10 is released and the vehicle 10 is locked. As a result, the agent cannot unlock and drive the vehicle 10 again.

In the first embodiment, the issuing request is transmitted after the agent terminal 200B arrives at the delivery place. Alternatively, it is also possible for the agent terminal 200B to receive the authentication information by transmitting the issuing request at an appropriate timing after user information reception. In the first embodiment, the management device 400 transmits the authentication information to the agent terminal 200B after waiting for issuing request reception. Also conceivable is sending the authentication information with the user information and the position information with issuing request reception omitted.

Locking and Unlocking System Including Key Unit

Figure 14:
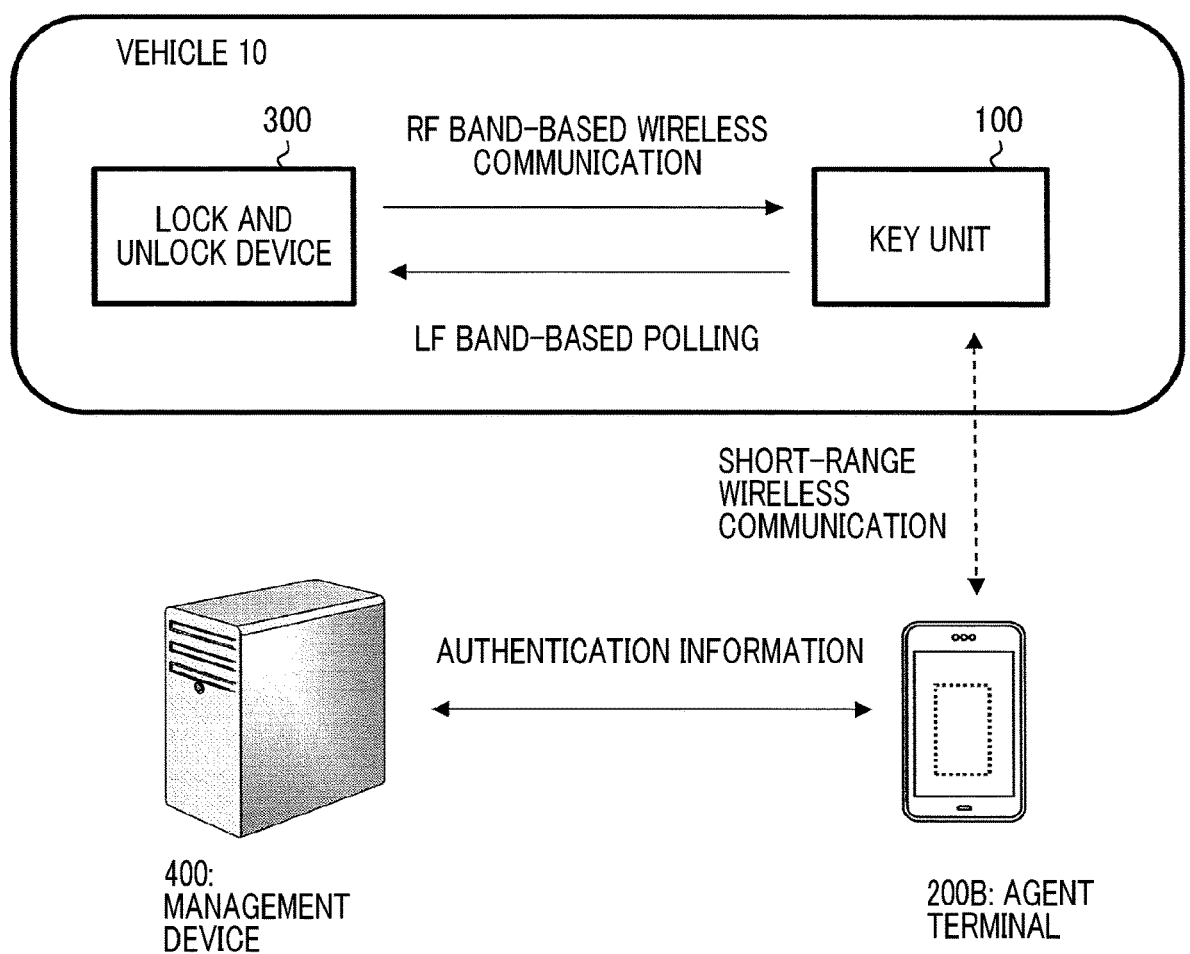
FIG. 14 is a diagram illustrating a schematic configuration of a locking and unlocking system including a key unit.

A locking and unlocking system including the key unit 100 for locking and unlocking of the vehicle 10 will be described below. As illustrated in FIG. 14, the locking and unlocking system according to the first embodiment is configured to include the key unit 100 and the locking and unlocking device 300 mounted in the vehicle 10, the portable terminal 200 (agent terminal 200B), and the management device 400. In the locking and unlocking system according to the first embodiment, the key unit 100 has the same wireless interface as the electronic key of a smart key, and communicates with the existing locking and unlocking device 300. As a result, the vehicle 10 can be locked and unlocked without a physical key being used. The key unit 100 performs short-range wireless communication with the agent terminal 200B. Whether or not the key unit 100 operates as an electronic key of the vehicle 10 is determined based on the result of authentication of the agent terminal 200B. The agent can lock and unlock the vehicle 10 by operating the agent terminal 200B outside the vehicle 10.

System Configuration

Figure 15:
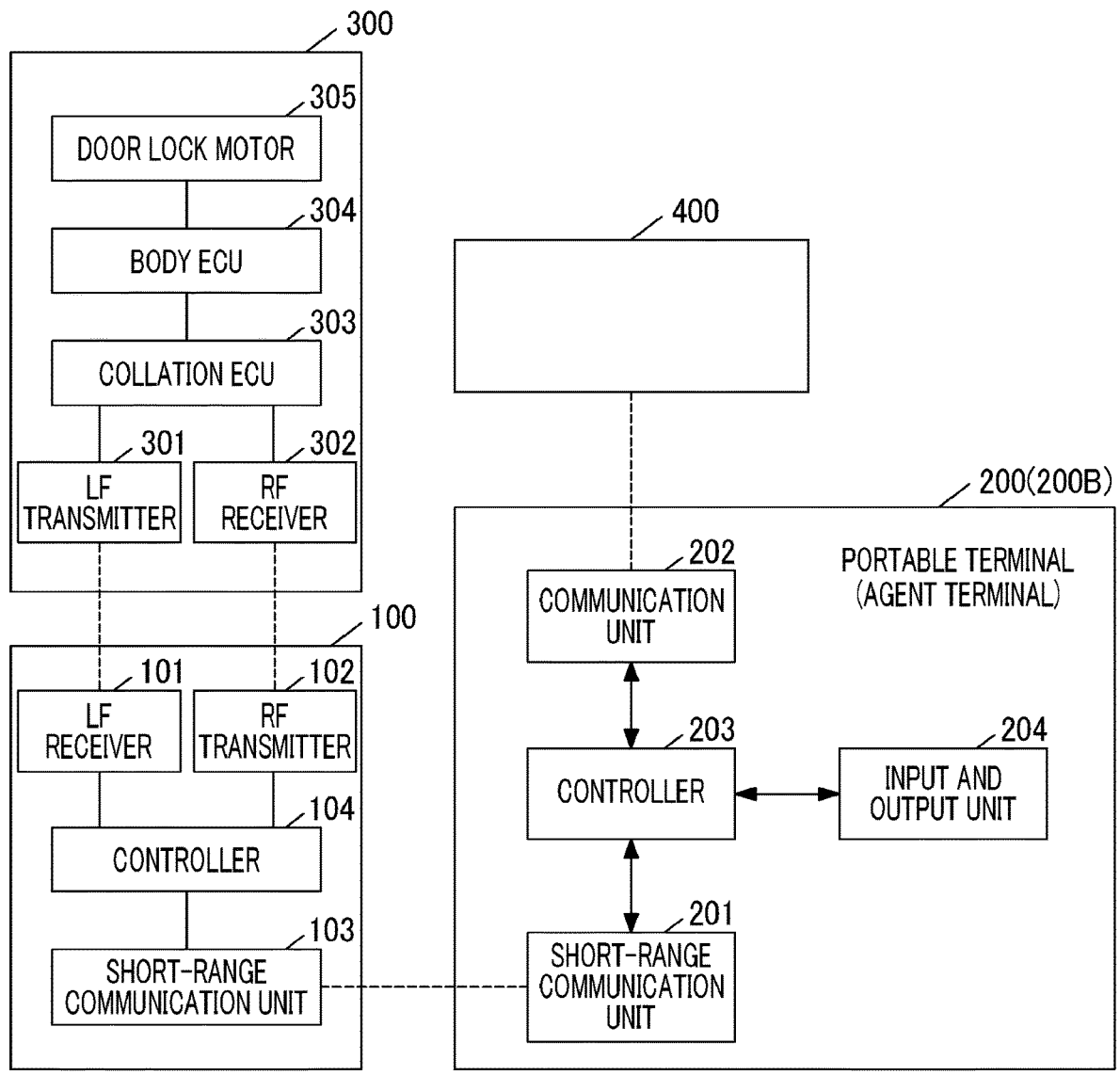
FIG. 15 is a block diagram schematically illustrating an example of the configuration of the key unit, the portable terminal, the locking and unlocking device, and a server device that are illustrated in FIG. 14.

FIG. 15 is a block diagram schematically illustrating an example of the configuration of the key unit 100, the agent terminal 200B, the locking and unlocking device 300, and the management device 400 illustrated in FIG. 14. The locking and unlocking device 300 locks and unlocks the doors of the vehicle 10 in response to a lock signal and an unlock signal transmitted from the electronic key possessed by the user of the vehicle 10 via radio waves in a radio frequency (hereinafter, referred to as RF) band. In addition, the locking and unlocking device 300 has a function to transmit radio waves in a low frequency (hereinafter, referred to as LF) band for searching for a portable device.

The key unit 100 controls locking and unlocking of the doors of the vehicle 10 by transmitting and receiving radio waves in the RF band and the LF band to and from the locking and unlocking device 300 instead of the portable device possessed by the user. In the following description, the communication destination of the locking and unlocking device 300 will be limited to the key unit 100 unless otherwise noted.

The locking and unlocking device 300 includes an LF transmitter 301, an RF receiver 302, a collation electronic control unit (ECU) 303, a body ECU 304, and a door lock motor 305. The LF transmitter 301 transmits radio waves in a low frequency band (such as 100 KHz to 300 KHz) for searching for (polling) the key unit 100. For example, the LF transmitter 301 is incorporated in the vicinity of the center console and the steering wheel in the cabin of the vehicle. The RF receiver 302 receives radio waves in a radio frequency band (such as 100 MHz to 1 GHz) transmitted from the key unit 100. The RF receiver 302 is disposed anywhere in the vehicle cabin.

The collation ECU 303 performs control for locking and unlocking the doors of the vehicle 10 based on a signal (hereinafter, also referred to as a lock signal or an unlock signal) transmitted from the key unit 100 via radio waves in the RF band. The collation ECU 303 is constituted by, for example, a microcomputer. In the following description, the lock signal and the unlock signal will be collectively referred to as a lock and unlock signal. The term, lock and unlock signal, represents at least one of the lock signal and the unlock signal.

The collation ECU 303 authenticates that the lock and unlock signal from the key unit 100 is a signal transmitted from an authorized device. Specifically, the collation ECU 303 determines whether or not the key ID included in the lock and unlock signal corresponds to the key ID pre-stored in the storage unit of the collation ECU 303. The collation ECU 303 transmits an unlock command or a lock command to the body ECU 304 based on the result of the authentication. The unlock command or the lock command is transmitted via an in-vehicle network such as a controller area network (CAN).

The body ECU 304 is a computer that performs body control for the vehicle 10. The body ECU 304 unlocks and locks the doors of the vehicle 10 by controlling the door lock motor 305 based on the unlock command or the lock command received from the collation ECU 303. The door lock motor 305 is an actuator for locking and unlocking the doors of the vehicle 10 (including its trunk as well as doors for occupants and rear gate). The door lock motor 305 operates based on a signal from the body ECU 304.

The key unit 100 authenticates the agent terminal 200B by performing short-range wireless communication with the agent terminal 200B and transmits the lock and unlock signal by using radio waves in the RF band based on the result of the authentication. The key unit 100 includes, as an example, an LF receiver 101, an RF transmitter 102, a short-range communication unit 103, and a controller 104.

The LF receiver 101 receives a polling signal transmitted via radio waves in the LF band from the locking and unlocking device 300. The LF receiver 101 has an antenna (hereinafter, referred to as an LF antenna) for receiving radio waves in the LF band. The RF transmitter 102 transmits the lock and unlock signal to the key unit 100 via radio waves in the RF band.

The short-range communication unit 103 communicates with the agent terminal 200B possessed by the user. The short-range communication unit 103 performs short-range communication by using a predetermined wireless communication standard (to the extent that communication can be performed between the inside and the outside of the vehicle cabin).

The short-range communication unit 103 performs, for example, BLE-based data communication. The BLE is a low electric power communication standard based on the Bluetooth (registered trademark), and is characterized in that communication can be immediately initiated by opponent detection and no device-to-device pairing is needed. Applicable in place of the BLE are the NFC, the UWB, the WiFi (registered trademark), and so on.

The controller 104 performs short-range wireless communication with the agent terminal 200B via the short-range communication unit 103 and performs control for authenticating the agent terminal 200B and control for transmitting the lock and unlock signal based on the result of the authentication. The controller 104 includes, for example, a processor and a memory. The processor realizes various functions by executing a control program stored in the memory for controlling the key unit 100. The controller 104 realizes, for example, a function to receive, via the LF receiver 101, a polling signal transmitted as a radio wave in the LF band from the locking and unlocking device 300, a function to transmit the lock and unlock signal as a radio wave in the RF band to the locking and unlocking device 300 via the RF transmitter 102, a function to process communication with the agent terminal 200B performed via the short-range communication unit 103, and a function to generate the lock and unlock signal in a case where the authentication of the agent terminal 200B by an authentication unit is successful.

The controller 104 performs authentication processing for the agent terminal 200B based on the authentication information included in a lock request or an unlock request (hereinafter, collectively referred to as a lock and unlock request) transmitted from the agent terminal 200B. Specifically, the controller 104 compares the authentication information stored in the storage unit with the authentication information transmitted from the agent terminal 200B, and determines that the authentication is successful in a case where the two authentication information pieces match. The controller 104 determines that the authentication is unsuccessful in a case where the two authentication information pieces do not match. In a case where the authentication of the agent terminal 200B is successful, a lock and unlock signal generated in response to a request received from the agent terminal 200B is transmitted to the locking and unlocking device 300 via the RF transmitter 102. The method for the authentication may be an identity verification method based on simple authentication information comparison or an asymmetric encryption-based method. In the following description, the authentication information stored in the key unit 100 will be referred to as device authentication information and the authentication information transmitted from the agent terminal 200B will be simply referred to as authentication information as needed for description.

The key unit 100 transmits the ID of the electronic key (hereinafter, referred to as a key ID) to the locking and unlocking device 300 along with the lock and unlock signal. The key ID may be stored in advance in the key unit 100 in a plaintext state or may be stored in an encrypted state allowing the agent terminal 200B to decrypt it with the information included in the authentication information provided from the management device 400. In a case where the key ID is stored in an encrypted state, the key unit 100 may obtain the original key ID by decrypting the encrypted key ID by using the information included in the authentication information received from the agent terminal 200B.

The agent terminal 200B will be described below. The agent terminal 200B functions as a device performing operations and processing as a short-range communication unit 201, a communication unit 202, a controller 203, and an input and output unit 204 by the processor 21 loading and executing a program stored in the storage device 22.

The short-range communication unit 201 corresponds to the short-range wireless communication circuit 27, and communicates with the key unit 100 by means of the same communication standard as that of the short-range communication unit 103. The communication unit 202 corresponds to the wireless communication circuit 23, connects the agent terminal 200B to the network 1, and administers communication with the management device 400 and so on. The communication unit 202 communicates with another device (such as the management device 400) via the network 1 by using a mobile communication service such as 3G and LTE.

The controller 203 corresponds to the processor 21. The controller 203 performs, for example, processing for lock and unlock request generation, processing for acquiring the above-described authentication information, and processing for transmitting the lock and unlock request and the authentication information to the key unit 100. The controller 203 performs processing for rewriting the control program stored in the memory of the key unit 100 as described later as well as the processing described above. The controller 203 interacts with the agent via the input and output unit 204. The input and output unit 204 corresponds to the input device 24 and the display 25, receives an input operation performed by the agent, and presents information with respect to the agent.

The controller 203 displays an operation screen on the input and output unit 204 and generates an unlock request or a lock request in accordance with an operation performed by the agent. For example, the controller 203 outputs an icon for unlocking, an icon for locking, and the like on a touch panel display, and generates an unlock request or a lock request based on an operation performed by the agent. The operation performed by the agent is not limited to those via the touch panel display. For example, it may be a hardware switch-based one as well.

The controller 203 performs processing for acquiring authentication information from the management device 400. The authentication information is not for authentication of the key unit 100 by the locking and unlocking device 300. The authentication information is for authentication of the agent terminal 200B by the key unit 100. Specifically, the controller 203 transmits, to the management device 400 via the communication unit 202, a signal for requesting authentication information issuance along with information for identification of the agent terminal 200B. Upon receiving the signal, the management device 400 acquires authentication information unique to the agent terminal 200B and transmits the acquired authentication information to the agent terminal 200B. As a result, an operation for unlocking the vehicle 10 can be performed on the agent terminal 200B. In a case where the agent terminal 200B has no authentication information, a lock operation and an unlock operation from an operation screen are impossible.

The authentication information acquired by the agent terminal 200B may be an immutable key or a one-time key. In either case, the device authentication information corresponding to the authentication information is stored in advance in the key unit 100.

Example of Operation of Locking and Unlocking System

An example of the operation of the locking and unlocking system is as follows. Once the agent performs an operation for locking or unlocking the vehicle 10 via the input and output unit 204 of the agent terminal 200B, the agent terminal 200B transmits the authentication information to the key unit 100 along with the unlock request or the unlock request corresponding to the operation of the agent. The key unit 100 performs authentication processing by comparing the received authentication information with the pre-stored device authentication information. In a case where the above-described authentication is successful, the key unit 100 transmits the key ID to the locking and unlocking device 300 along with a lock signal or an unlock signal. The locking and unlocking device 300 performs authentication processing based on the received key ID. Once the above-described authentication is successful, the door of the vehicle 10 is locked or unlocked by the locking and unlocking device 300.

Invalidation (Release of Operation Enablement State of Vehicle 10)

Release of the operable state of the vehicle 10 by the agent is performed as follows. For example, the management device 400 invalidates the authentication information issued to the agent terminal 200B. The specific content of the authentication information invalidation processing is not particularly limited insofar as it is possible that the agent cannot re-operate the vehicle 10 with the agent terminal 200B after parking completion.

The invalidation of the authentication information can be realized by, for example, the management device 400 performing the following processing. However, any method other than the above can be applied as an invalidation method insofar as the agent cannot unlock and drive the vehicle again after parking assistance by the agent is completed. (1) An instruction for authentication information deletion is given to the agent terminal 200B. (2) An instruction for setting an authentication information invalid flag is given to the agent terminal 200B. In this case, the agent terminal 200B is put into a state of transmitting no authentication information while the invalid flag is set. (3) An instruction is given to the agent terminal 200B for the expiration date of the authentication information to be rewritten to a past date and time. The agent terminal 200B deletes the authentication information with an already passed expiration date. (4) An instruction that the authentication information is invalid and transmission of invalid authentication information is prohibited is given to the agent terminal 200B. (5) The management device 400 communicates with the key unit 100 and gives the key unit 100 an instruction that the authentication information is invalid and unacceptable. (6) The management device 400 communicates with the key unit 100 and gives the key unit 100 an instruction to the effect that the authentication information from the agent terminal 200B is unacceptable with respect to the vehicle 10. (7) Also conceivable is manual authentication information deletion from the agent terminal 200B without communication by the management device 400.

First Modification Example of Locking and Unlocking System

In the first embodiment, an example in which the vehicle 10 is unlocked by the locking and unlocking device 300 in a case where the authentication processing is successful in the key unit 100 has been described. Alternatively, the processing in the key unit 100 may be executed in the locking and unlocking device 300. In other words, the locking and unlocking device 300 may include a control unit (ECU) for authenticating the authentication information received from the agent terminal 200B and the control unit may transmit an unlock command or a lock command to the body ECU 304 via an in-vehicle network such as a CAN when the authentication of the user terminal 200A is suc- cessful. With the above configuration, the agent can operate the vehicle 10 in a simple configuration without the key unit 100.

Second Modification Example of Locking and Unlocking System

In the first embodiment, the lock and unlock signal is transmitted from the key unit 100 to the locking and unlocking device 300 and the vehicle 10 is locked and unlocked when the agent terminal 200B receives the authentication information as enablement data for the vehicle 10 from the management device 400 and the agent terminal 200B is authenticated based on the authentication information. However, the authentication information may include key ID information for unlocking and locking of the vehicle 10 without being information for authentication of the agent terminal 200B. In this case, the agent terminal 200B receives the authentication information including the key ID from the management device 400 and transmits the received key ID to the locking and unlocking device 300 along with the lock and unlock signal. The locking and unlocking device 300 collates the received key ID with the key ID pre-stored in the locking and unlocking device 300, and locks and unlocks the vehicle 10 when the key IDs match. The key ID may be transmitted and received in an encrypted state between the agent terminal 200B and the management device 400 or the locking and unlocking device 300. For example, the management device 400 may generate a one-time key by encrypting the key ID with a predetermined algorithm along with time information. In the locking and unlocking device 300, the received one-time key may be decrypted by a method corresponding to the same predetermined algorithm as that of the management device 400 and collated with the key ID pre-stored in the locking and unlocking device 300. The one-time key may be transmitted from the management device 400 to a lending management server (not illustrated) and may be transmitted from the lending management server to the agent terminal 200B. In any case, the agent terminal 200B makes an invalidation attempt by deleting the one-time key when a predetermined time elapses from one-time key receipt. By the one-time key generated from the time information and the key ID being included in the authentication information, the management device 400 is capable of temporarily generating valid authentication information at each time of parking assistance and transmitting the information to the agent terminal 200B.

Third Modification Example of Locking and Unlocking System

As described above, the management device 400 may transmit the authentication information for the agent terminal 200B corresponding to fixed authentication information unique to the key unit 100 to the agent terminal 200B or transmit the key ID pre-stored in the locking and unlocking device 300 of the vehicle 10. Alternatively, the management device 400 may generate new authentication information and issue it to the agent terminal 200B every time an authentication information request is received from the agent terminal 200B. In this case, the management device 400 may store the device authentication information for the key unit 100 corresponding to the new authentication information for the agent terminal 200B in the key unit 100 via an in-vehicle communication device (not illustrated) capable of communicating with the network 1 to which the agent terminal 200B is connected. In this case, the key unit 100 may be connected to the in-vehicle communication device via a CAN or the like. Alternatively, the management device 400 may generate new authentication information based on identification information for identification of the vehicle 10 and time information and may deliver the new authentication information and the time information to the agent terminal 200B. In this case, the key unit 100 may also generate new authentication information by a method corresponding to the same algorithm as that of the management device 400. The agent terminal 200B may transmit the new authentication information and the time information to the key unit 100 for authentication.

Action and Effect of First Embodiment

According to the first embodiment, the parking assistance service can be run by means of the management device 400, and thus it is possible to eliminate a driver's inconvenience attributable to waiting in a parking lot. In the parking assistance service according to the first embodiment, the key unit 100 is operated as an electronic key by means of the agent terminal 200B, and thus the agent can operate the vehicle 10. Accordingly, the agent can provide parking assistance even without directly meeting with a service user (even without delivery of a physical key such as an electronic key). As a result, inconvenience attributable to a service user having to meet with an agent for physical key delivery can be avoided and a hassle attributable to physical key return by the agent can be avoided.

The following advantages can be obtained by the management device 400 sending the agent terminal 200B the information indicating the position of the vehicle 10 received from the user terminal 200A. (1) Even in a case where no delivery place is specified by the service user, the vehicle 10 can be quickly discovered by the agent becoming a clue for searching for the vehicle 10. (2) In a case where a delivery place is determined, the delivery place is, for example, a parking lot of a large-scale road side station, and a plurality of vehicles is stopped there, the vehicle 10 to be delivered can be efficiently discovered by the position of the vehicle 10 being used as a clue. (3) In a case where a delivery place is determined yet stopping at the planned place is impossible for various circumstances (including a case where the stopping position (parking space) is changed within the delivery place and a case where stopping occurs at a different delivery place), the agent can search for and discover the vehicle 10 by using the actual position of the vehicle 10 as a clue.

In the first embodiment, the processing for position information acquisition and transmission by the user terminal 200A is repeatedly performed until a predetermined termination condition is satisfied, and the processor 411 and the communication IF 413 of the management device 400 repeatedly acquire the position information on the vehicle 10 from the user terminal 200A and perform processing for transmitting the information to the agent terminal 200B. As a result, the result of tracking of the position of the vehicle 10 is provided for the agent through the agent terminal 200B, and thus vehicle discovery by the agent can be facilitated. According to the first embodiment, the agent is selected from the agent candidates based on the information indicating the position of the vehicle 10 and the information indicating the positions of the agent candidates, and thus the agent can be efficiently dispatched to the vehicle 10 (service user).

Second Embodiment

Figure 16:
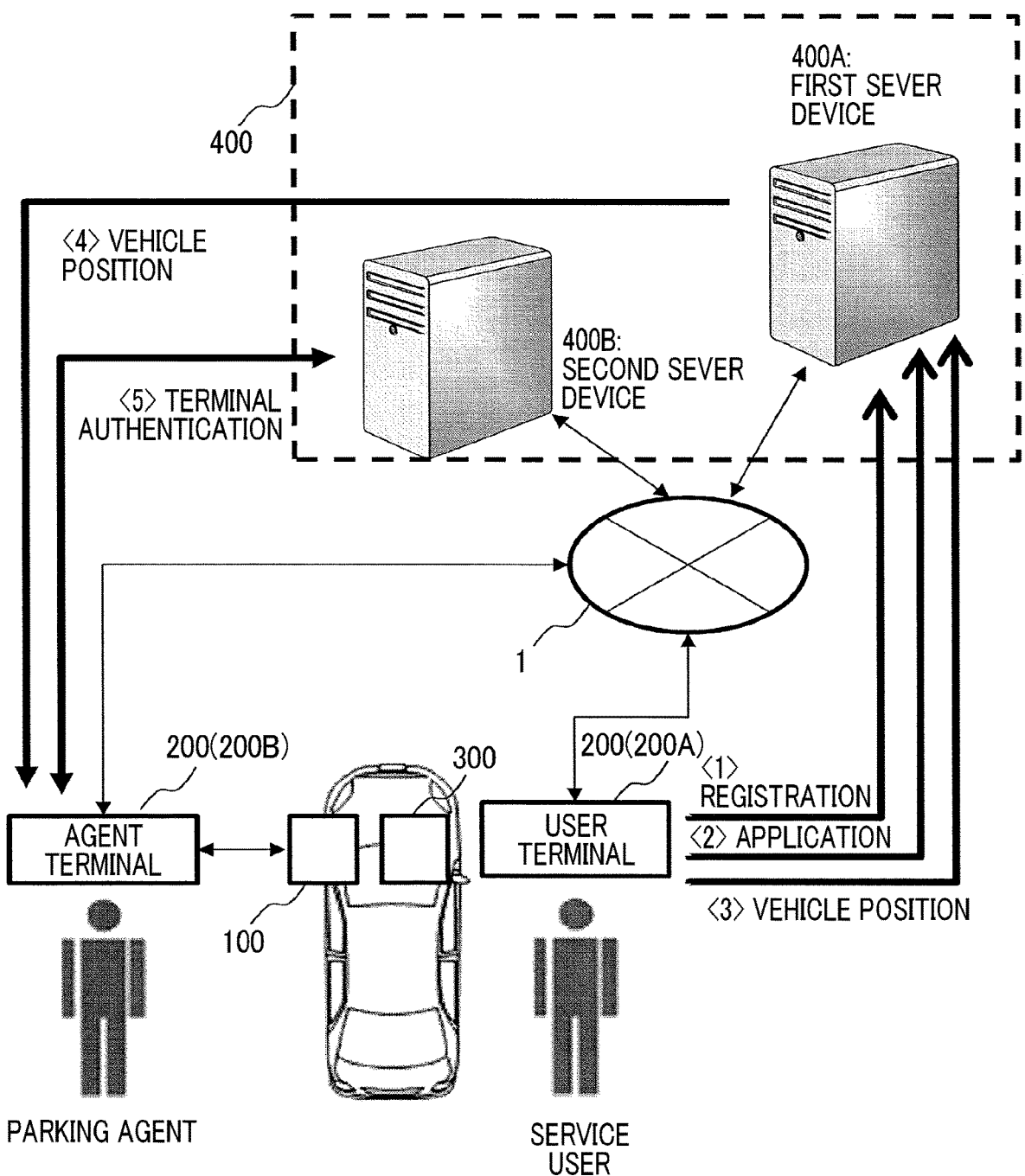
FIG. 16 is a schematic diagram illustrating a system configuration example according to a second embodiment.

A second embodiment will be described below. The configuration of the second embodiment has the same features as the configuration of the first embodiment. Therefore, in the following description, differences will be described with description of the common points omitted. FIG. 16 is a schematic diagram that illustrates a system configuration example according to the second embodiment. The second embodiment is different from the first embodiment in the following points. In other words, the management device 400 according to the first embodiment is a device including a first server device 400A and a second server device 400B. The first server device 400A performs processing for operating as a parking assistance service management device among the processing performed by the management device 400. The second server device 400B performs processing for operating as an enablement data issuing device among the processing performed by the management device 400.

FIG. 17 is a sequence diagram that illustrates the flow from the service user's parking assistance service use application to authentication information acquisition according to the second embodiment. The processing of <1> to <12> in FIG. 17 is almost the same as the processing of <1> to <12> according to the first embodiment (FIG. 10). However, the second embodiment differs from the first embodiment in that, in <11> in FIG. 17, the first server device 400A includes information indicating a method for accessing the second server device 400B in the user information transmitted to the agent terminal 200B, examples of the method-indicating information including the address of the second server device 400B. The agent terminal 200B sends an authentication information issuing request to the second server device 400B by using the address of the second server device 400B (<13> in FIG. 17). The second server device 400B issues authentication information in response to the issuing request and sends it to the agent terminal 200B (<14> in FIG. 17). Except for the above points, the configuration of the second embodiment is the same as that of the first embodiment, and thus description thereof will be omitted.

The same effects as those of the first embodiment can be obtained from the second embodiment. However, according to the second embodiment, the processing of the management device 400 is distributed to the first server device 400A and the second server device 400B to the extent that no burden arises on the service user's or agent's part, and thus additive dispersion can be achieved for service user management and authentication information management. The user terminal 200A does not access the second server device 400B having authentication information, and thus different security levels can be adopted for the first server device 400A and the second server device 400B. For example, it is conceivable to loosen the security level of the first server device 400A as compared with that of the second server device 400B to reduce the processing and time needed for an interaction with the user terminal 200A.

In the first and second embodiments described above, a configuration has been described in which the key unit 100 is operated as an electronic key by means of the agent terminal 200B. The parking assistance service according to the first and second embodiments can be implemented even when the vehicle of the service user is a vehicle in which the key unit 100 is not mounted. In this case, vehicle (physical key) delivery may be directly performed between the service user and the agent. The configurations according to the first and second embodiments described above can be appropriately combined.

What is claimed is:

1. A parking assistance service management device that manages a parking assistance service in which an agent provides parking assistance for a vehicle of a service user, the parking assistance service management device comprising:
- circuitry programmed to:
- receive user information including information indicating a position of the vehicle from a terminal of the service user;
- select the agent providing the parking assistance for the vehicle based on the user information including the information indicating the position of the vehicle and agent information including a moving speed of the agent;
- transmit the information indicating the position of the vehicle to a terminal of the selected agent; and
- transmit enablement data to the terminal of the selected agent, the enablement data being data for allowing the agent to operate the vehicle using the terminal of the selected agent,
- wherein the information indicating the position of the vehicle is repeatedly acquired from the terminal of the service user until the agent reaches the position of the vehicle.

2. The parking assistance service management device according to claim 1, wherein the circuitry is programmed to transmit, to the terminal of the agent, information for specifying the vehicle to be displayed on a display of the terminal of the agent.

3. The parking assistance service management device according to claim 1, wherein the circuitry is programmed to select, based on the position of the vehicle and positions of each of a plurality of agent candidates, the agent to provide the parking assistance for the vehicle from the plurality of agent candidates.

4. A management method for managing a parking assistance service in which an agent provides parking assistance for a vehicle of a service user, the management method comprising:
- receiving, by a processor, user information including information indicating a position of the vehicle from a terminal of the service user;
- selecting, by the processor, the agent providing the parking assistance for the vehicle based on the user information including the information indicating the position of the vehicle and agent information including a moving speed of the agent;
- transmitting, by the processor, the information indicating the position of the vehicle to a terminal of the selected agent;
- transmitting, by the processor, enablement data to the terminal of the selected agent, the enablement data being data for allowing the selected agent to operate the vehicle using the terminal of the agent; and
- selecting, by the processor, the agent providing the parking assistance for the vehicle based on the user information including the information indicating the position of the vehicle and agent information including a moving speed of the agent,
- wherein the information indicating the position of the vehicle is repeatedly acquired from the terminal of the service user until the agent reaches the position of the vehicle.

5. A non-transitory computer-readable storage medium storing a program for managing a parking assistance service in which an agent provides parking assistance for a vehicle of a service user, the program causing a computer to execute a method comprising:
- receiving user information including information indicating a position of the vehicle from a terminal of the service user;
- selecting the agent providing the parking assistance for the vehicle based on the user information including the information indicating the position of the vehicle and agent information including a moving speed of the agent;
- transmitting the information indicating the position of the vehicle to a terminal of the selected agent; and
- transmitting enablement data to the terminal of the selected agent, the enablement data being data for allowing the selected agent to operate the vehicle using the terminal of the agent,
- wherein the information indicating the position of the vehicle is repeatedly acquired from the terminal of the service user until the agent reaches the position of the vehicle.

6. The parking assistance service management device according to claim 1, wherein the enablement data includes authentication information configured to allow the agent to start an engine of the vehicle with the terminal of the agent.

7. The parking assistance service management device according to claim 1, wherein the circuitry is configured to select the agent providing the parking assistance for the vehicle having a difference between a moving speed of the vehicle and the moving speed of the agent that is smaller than other candidate agents.

* * * * *